(12) United States Patent
Kimura et al.

(10) Patent No.: US 8,595,140 B2
(45) Date of Patent: Nov. 26, 2013

(54) FIRMWARE DISTRIBUTING DEVICE, PROGRAM, AND METHOD

(75) Inventors: Yoshihiro Kimura, Kawasaki (JP); Tomohiro Hikita, Sendai (JP); Ikuko Tachibana, Kawasaki (JP); Toshiaki Hayashi, Kawasaki (JP); Takashi Tanifuji, Kawasaki (JP); Yasutaka Tanikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 618 days.

(21) Appl. No.: 12/664,993

(22) PCT Filed: Jun. 25, 2007

(86) PCT No.: PCT/JP2007/062669
§ 371 (c)(1),
(2), (4) Date: Aug. 23, 2010

(87) PCT Pub. No.: WO2009/001422
PCT Pub. Date: Dec. 31, 2008

(65) Prior Publication Data
US 2011/0119664 A1    May 19, 2011

(51) Int. Cl.
*G06F 21/00*    (2013.01)
*G06F 15/16*    (2006.01)

(52) U.S. Cl.
USPC .............................. 705/59; 709/219; 455/411

(58) Field of Classification Search
USPC .............................. 705/59; 709/219; 455/411
See application file for complete search history.

(56) References Cited

U.S. PATENT DOCUMENTS

| 8,230,414 | B1* | 7/2012 | Hand et al. | 717/168 |
| 2002/0138441 | A1* | 9/2002 | Lopatic | 705/59 |
| 2008/0028046 | A1* | 1/2008 | Ushiki | 709/219 |
| 2009/0131020 | A1* | 5/2009 | van de Groenendaal | 455/411 |
| 2010/0036905 | A1* | 2/2010 | Shima | 709/203 |

FOREIGN PATENT DOCUMENTS

| DE | 10053214 | 5/2002 |
| EP | 1521175 | 4/2005 |
| JP | 2001-344130 | 12/2001 |
| JP | 2002-132368 | 5/2002 |
| JP | 2003-005991 | 1/2003 |
| JP | 2003-5991 | 1/2003 |
| JP | 2005-130134 | 5/2005 |
| JP | 2005-242447 | 9/2005 |

OTHER PUBLICATIONS

Japanese Office Action mailed Jun. 5, 2012 issued in corresponding Japanese Patent Application No. 2009-520224.

(Continued)

*Primary Examiner* — Charles C Agwumezie
(74) *Attorney, Agent, or Firm* — Staas & Halsey LLP

(57) ABSTRACT

Modified firmware is registered and controlled, and, when a download request is received from a terminal device, unupdated firmware is determined and downloaded to the terminal device. User identification information obtained from the download request is acquired, and, if the user identification information matches the user identification information of another terminal device that is already carrying out download, the download to the terminal device that output the download request is stopped. Even when the user identification information matches the user identification information of the other terminal device that is already carrying out download, if it is determined to be a download request by an operator operation, stopping the download is cancelled so as to execute the download, and a forcible termination notification is transmitted to the other terminal device that is already executing download so as to interrupt the download thereof in the process.

10 Claims, 33 Drawing Sheets

(56) References Cited

OTHER PUBLICATIONS

Extended European Search Report dated Jun. 19, 2012 issued in corresponding European Patent Application No. 07767476.0.

Thiemo Voigt et al., "In-Kernel Mechanisms for Adaptive Control of Overloaded Web Servers", Internet Citation XP-002290368, Sep. 2000, pp. 1-8.

* cited by examiner

FIG. 5

| TARGET SERIES | FIRMWARE NAME | FIRMWARE VERSION NUMBER | FIRMWARE |
|---|---|---|---|
| 00ABCD | X1000 | 01300000 | X1000A.firm |
| 00ABCD | X1001 | 01300000 | X1001A.firm |
| 00ABCD | X1002 | 01300000 | X1002A.firm |
| | | | |
| | | | |
| | | | |
| | | | |
| | | | |

| DOWNLOAD TERMINATION NOTIFICATION COMMAND | 122 |
|---|---|
| 00ABCD###PQRY####0001## | 84 |

| DEVICE ID | CUSTOMER NAME |
|---|---|
| 00ABCD###PQRY####0001## | ○○ STOCK CORPORATION |
| 00ABCD###PQRY####0099## | ○○ STOCK CORPORATION |
| | |
| | |

| FIRMWARE NAME | FIRMWARE VERSION NUMBER | DOWNLOAD STATE |
|---|---|---|
| X1000 | 01200000 | FINISHED |
| X1001 | 01200000 | |
| X1002 | 01200000 | |

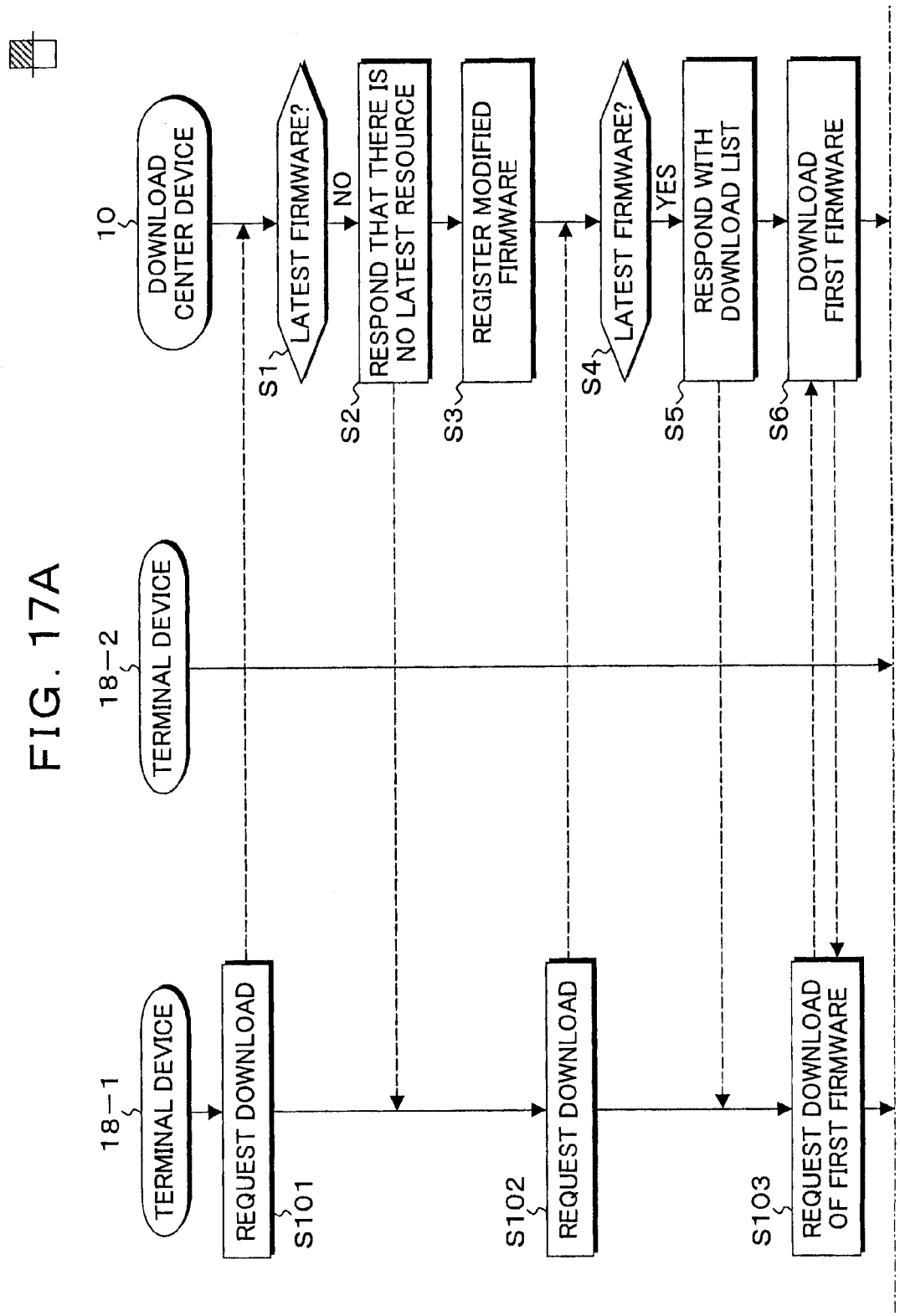

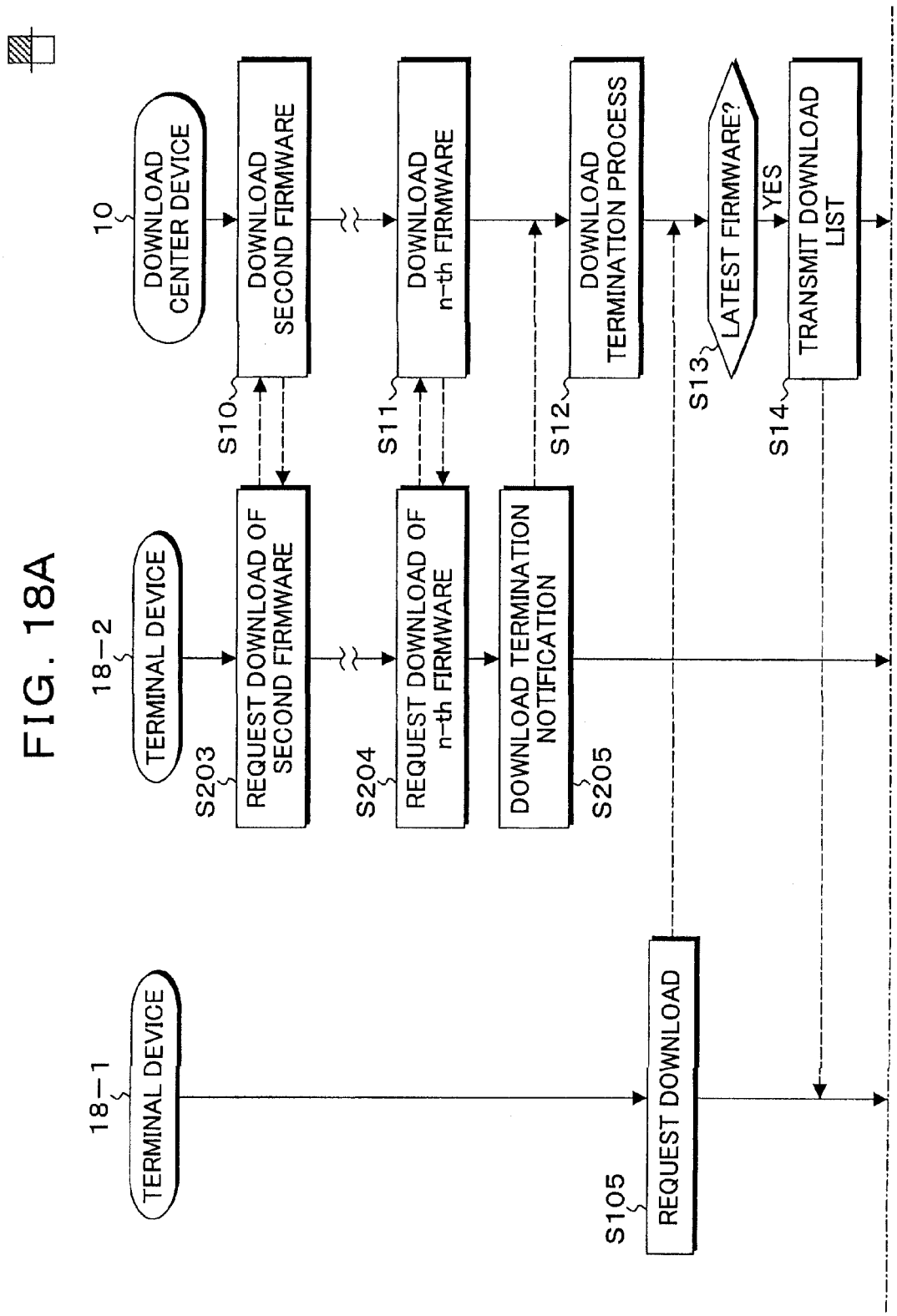

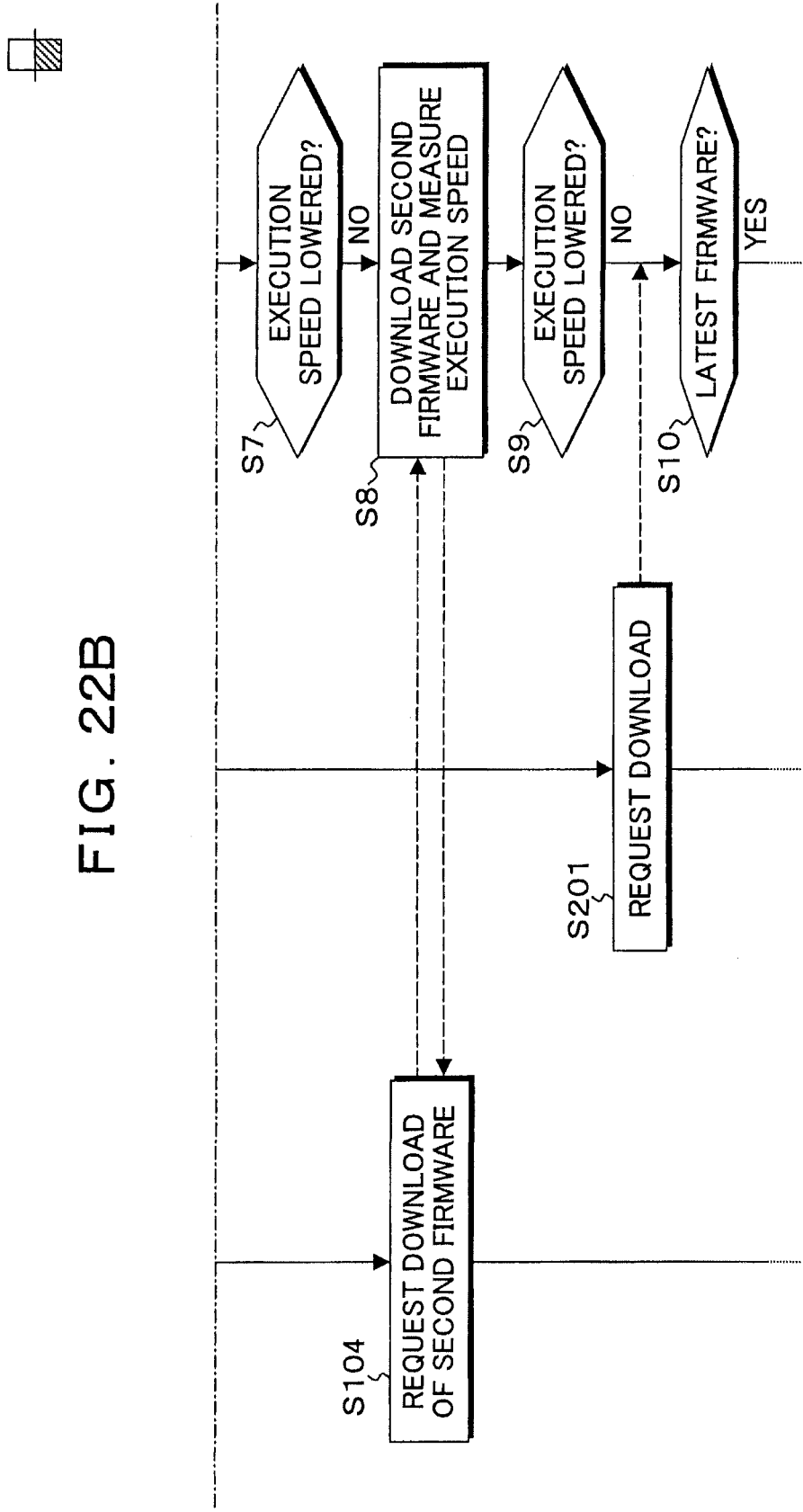

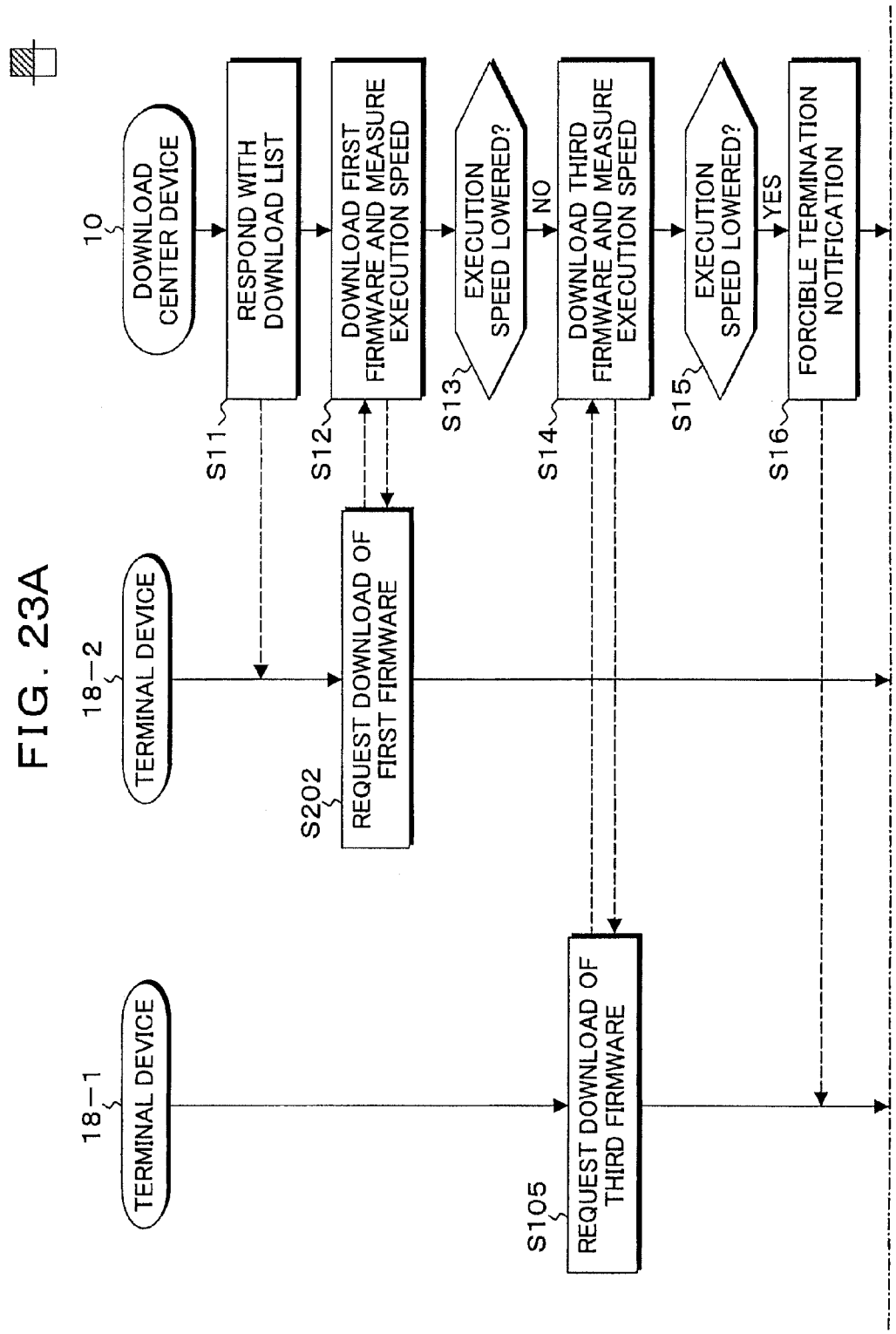

FIRMWARE DISTRIBUTING DEVICE, PROGRAM, AND METHOD

This application is a continuation of PCT/JP2007/062669 filed Jun. 26, 2007.

BACKGROUND OF THE INVENTION

1. Field of the Invention

The present invention relates to a firmware distributing device, program, and method which download firmware to a plurality of terminal devices via a network, and particularly relates to a firmware distributing device, program, and method which appropriately process the download of firmware to a plurality of terminal devices which share a communication line.

2. Description of the Related Arts

Conventionally, the firmware distributing system which applies modified firmware by downloading the modified firmware to a plurality of terminal devices via a network is, for example, the one shown in FIG. 26. In FIG. 26, the firmware distributing system connects a plurality of terminal devices 202-1 to 202-n to a center device 200 via a communication line such as a network 204. The terminal devices 202-1 to 202-n store firmware 206-1 to 206-n and execute necessary terminal control processes by executing the firmware 206-1 to 206-n. When the firmware 206-1 to 206-n stored in the terminal devices 202-1 to 202-n is to be modified, modified firmware 208 is registered to the center device 200. Each of the terminal devices 202-1 to 202-n transmits a download request to the center device 200 at a scheduled constant time interval or at the timing ordered by the operation of an operator and checks whether the modified firmware 208 is registered in the center device 200. When the modified firmware 208 is registered in the center device 200, the modified firmware 208 is downloaded to carry out update, thereby applying it to the device. However, in such a conventional firmware distributing system, in the case in which each of the plurality of terminal devices checks at every constant cycle whether the firmware to be modified is registered in the center device and downloads the firmware, if the firmware is downloaded in the same time period by a plurality of the terminal devices, the download time becomes extremely long when they are the plurality of terminal devices sharing a communication line and belonging to, for example, the same customer site, the processes of the download may be terminated due to communication timeout, and, at the same time, the resource of the center side is occupied during that period, which has been problems. In order to solve these problems, conventionally, as shown in FIG. 27, with respect to the terminal devices 202-1 to 202-3 of the same customer site sharing the communication line, the download start time of the firmware is set in advance so as to be mutually shifted like time t1, t2, and t3, thereby providing a countermeasure so that the download time is not mutually overlapped.

Patent Document 1: Japanese Patent Application Laid-Open (kokai) No. 2005-242447

However, in such a conventional method of setting the download start time of the firmware in advance so that the time is mutually shifted among the plurality of terminal devices sharing the communication line, for example, as shown in FIG. 28, when the degree of shifting of the time is not enough among the plurality of devices 202-1 to 202-3 sharing the communication line, the download time is mutually overlapped, which is a problem. Moreover, even when the degree of shifting of the download start time of the plurality of devices 202-1 to 202-3 sharing the communication line is appropriate in the beginning as shown in FIG. 27, when the firmware to be modified becomes large and the download time becomes long as shown in FIG. 29, the download time is mutually overlapped, which is a problem. Moreover, with respect to the download request of the firmware ordered by the operator, the firmware is immediately downloaded when the modified firmware has been registered. However, if another terminal device sharing the communication line is downloading firmware at this point, the download time takes longer by the amount corresponding to sharing of the communication line, and the operator is excessively kept waiting by that amount, which is a problem.

SUMMARY OF THE INVENTION

According to the present invention, a firmware distributing device, program, and method are provided which carry out control so that download of firmware is not mutually overlapped so as to shorten the download time and prevent wasteful occupation of the firmware resource of the center side even when download requests are overlapped with respect to the terminal devices sharing a communication line.

(Device)

The present invention provides a firmware distributing device. The firmware distributing device of the present invention has:

a registration control unit registering and controlling firmware;

a download executing unit determining unupdated firmware in a terminal device when a download request is received from the terminal device and downloading the determined firmware to the terminal device; and a download stopping unit acquiring user identification information obtained from the download request and, if the user identification information matches user identification information of another terminal device which is already carrying out download, stopping download with respect to the terminal device output the download request.

Herein, the download request received from the terminal device includes a device identifier, the user identification information, and updated firmware information; and the download executing unit compares the updated firmware information obtained from the download request with registered firmware information controlled by the registration control unit so as to determine the unupdated firmware.

The download executing unit responds and transmits list information of the unupdated firmware to the terminal device and sequentially downloads the unupdated firmware corresponding to a download request from the terminal device, the download request being in a firmware unit and based on the list information.

The firmware distributing device of the present invention further has an operator request processing unit, if the download request is determined to be a download request by an operator operation, cancelling the download stop to be carried out by the download stopping unit so as to let the download executing unit execute download, and transmitting a forcible termination notification to the other terminal device already executing download so as to interrupt the download in the process.

The download request further includes download schedule time information; and the operator request processing unit compares the download schedule time information obtained from the download request with actual request time and, if unmatched, determines that the download request is the download request by the operator operation.

Another mode of the firmware distributing device according to the present invention has:

a registration control unit registering and controlling firmware;

a download executing unit determining unupdated firmware when a download request is received from a terminal device and downloading the firmware to the terminal device; and a download forcible termination unit measuring an execution speed when the unupdated firmware is downloaded to the terminal device by the download executing unit and, if the execution speed is reduced than a previous download execution speed, transmitting a forcible termination notification to the terminal device so as to interrupt the download in the process.

Herein, the download executing unit responds and transmits list information of the unupdated firmware to the terminal device and sequentially downloads the unupdated firmware corresponding to a download request from the terminal device, the download request being in a firmware unit and based on the list information; and the download forcible termination unit measures an execution speed in every download carried out in the firmware unit by the download executing unit and, if the measured execution speed is reduced than the previous execution speed, transmits the forcible termination notification to the terminal device so as to interrupt download of the unupdated firmware remaining in the list information.

(Program)

The present invention provides a program executed by the computer of the firmware distributing device. The program of the present invention causes the computer of a firmware distributing device to function as:

a registration control unit registering and controlling firmware;

a download executing unit determining unupdated firmware when a download request is received from the terminal device and downloading the firmware to the terminal device; and a download stopping unit acquiring user identification information obtained from the download request and, if the user identification information matches user identification information of another terminal device which is already carrying out download, stopping download with respect to the terminal device output the download request.

The program of the present invention, further causes the computer of the firmware distributing device to function as an operator request processing unit, if the download request is determined to be a download request by an operator operation, cancelling the download stop to be carried out by the download stopping unit so as to let the download executing unit execute download, and transmitting a forcible termination notification to the other terminal device already executing download so as to interrupt the download in the process.

Another mode of the program of the present invention causes a computer of a firmware distributing device to function as:

a registration control unit registering and controlling firmware;

a download executing unit determining unupdated firmware when a download request is received from a terminal device and downloading the firmware to the terminal device; and a download forcible termination unit measuring an execution speed when the unupdated firmware is downloaded to the terminal device by the download executing unit and, if the execution speed is reduced than a previous download execution speed, transmitting a forcible termination notification to the terminal device so as to interrupt the download in the process.

(Method)

The present invention provides a firmware distributing method. The firmware distributing method of the present invention includes:

a step of registering and controlling firmware;

a step of determining unupdated firmware when a download request is received from a terminal device and downloading the firmware to the terminal device; and a step of acquiring user identification information obtained from the download request and, if the user identification information matches user identification information of another terminal device which is already carrying out download, stopping download with respect to the terminal device output the download request.

The firmware distributing method of the present invention further includes an operator request processing step of, if the download request is determined to be a download request by an operator operation, cancelling the download stop to be carried out in the step of stopping download so as to execute download in the step of executing download, and transmitting a forcible termination notification to the other terminal device already executing download so as to interrupt the download in the process.

Another mode of the firmware distributing method of the present invention includes:

a step of registering and controlling firmware;

a step of determining unupdated firmware when a download request is received from a terminal device and downloading the firmware to the terminal device; and a download forcibly terminating step of measuring an execution speed when the unupdated firmware is downloaded to the terminal device in the step of executing download and, if the execution speed is reduced than a previous download execution speed, transmitting a forcible termination notification to the terminal device so as to interrupt the download in the process.

According to the present firmware distributing device, program, and method, when a download request is received from another terminal device during execution of download of firmware to a certain terminal device, if the user identification information that is obtained from the download request and identifies, for example, a customer matches the user identification information of the device that is already executing download, the download request is determined to be the download request from the terminal device that belongs to the same customer site sharing a communication line, download thereof is stopped by responding that there is no unupdated firmware even when there is unupdated firmware, overlapping of download of the plurality of terminal devices sharing the communication line is avoided, and timeout due to long download time and wasteful occupation of resources at the firmware distributing device-side can be prevented. Moreover, even in the case in which the user identification information obtained from the download request matches the user identification information that identifies the customer of the device that is already executing download and a response that there is no unupdated firmware is made, if the download request is determined to be the operator operation request, download of the unupdated firmware is started, the download of the other already-executing terminal device is forcibly stopped during the process, the request is prioritized so as to immediately carry out download when there is the operator operation request among the plurality of terminal devices sharing the communication line, the other device is forcibly stopped so that download is not mutually overlapped, and timeout due to long download time and wasteful occupation of resources at the firmware distributing device-side can be prevented. Moreover, the execution speed of the download to the terminal device is measured. If the measured execution speed is reduced than the previous execution speed, it is determined that download of the plurality of terminal devices sharing the communication line is mutually overlapped, the download is forcibly stopped so as to avoid overlapping of download, thereby preventing timeout due to long download time and wasteful occupation of resources at the firmware distributing device-side.

BRIEF DESCRIPTION OF THE DRAWINGS

FIG. 5 is an explanatory diagram showing a registered firmware control table in the present embodiment;

FIG. 10 is an explanatory diagram showing a download termination notification in the terminal device of the present embodiment;

FIG. 11 is an explanatory diagram showing a downloading device table in the terminal device of the present embodiment;

FIG. 12 is an explanatory diagram showing the download control table in the terminal device of the present embodiment;

FIGS. 17A and 17B are time charts showing download processes of firmware in the embodiment of FIG. 16;

FIGS. 18A and 18B are time charts showing the download processes of firmware subsequent to FIGS. 17A and 17B;

FIGS. 22A and 22B are time charts showing download processes of firmware in the embodiment of FIG. 21;

FIGS. 23A and 23B are time charts showing the download processes of the firmware subsequent to FIGS. 22A and 22B;

DETAILED DESCRIPTION OF THE PREFERRED EMBODIMENTS

Figure 1:
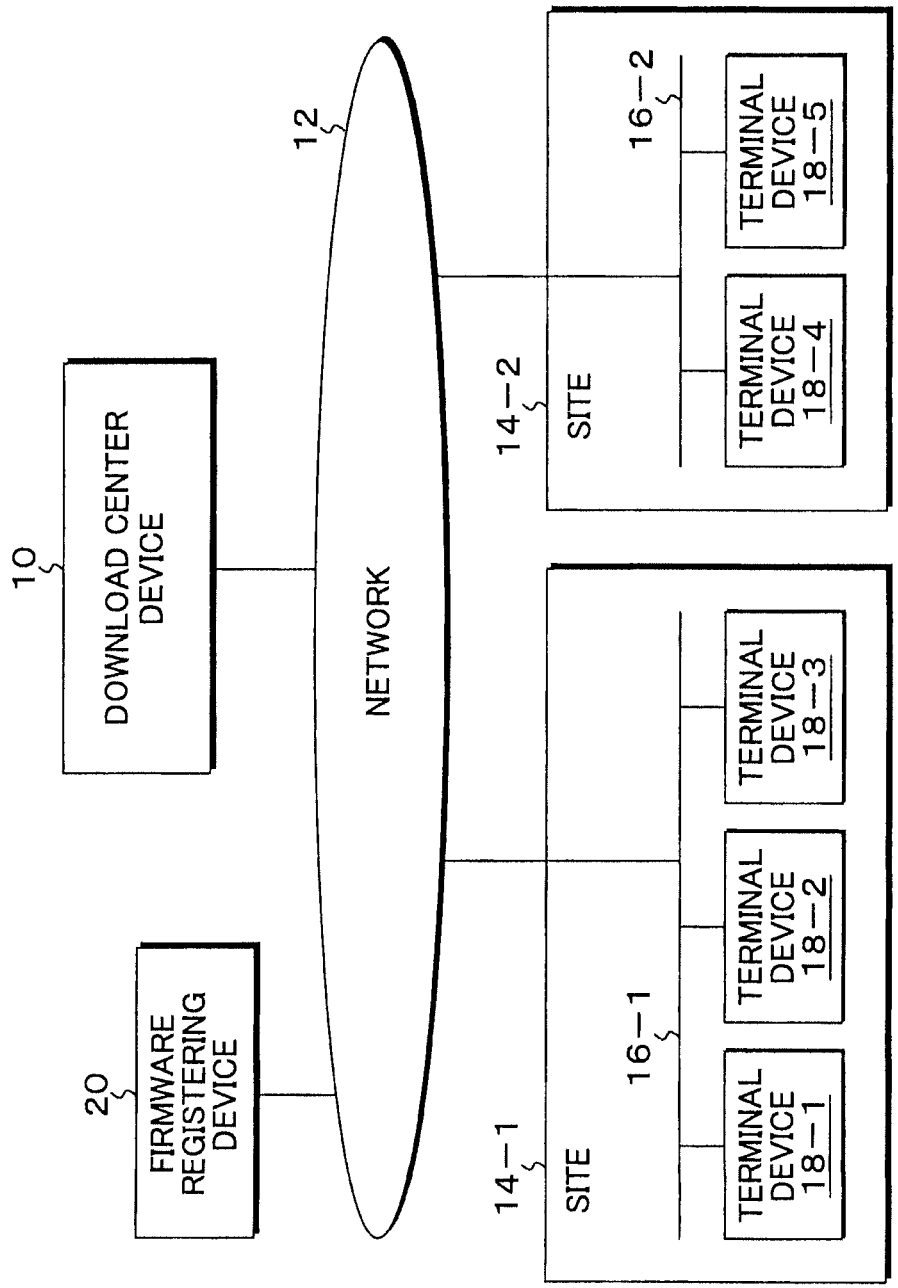
FIG. 1 is a block diagram showing an embodiment of a present firmware distributing system.

FIG. 1 is a block diagram showing an embodiment of a firmware distributing system. In FIG. 1, the firmware distributing system of the present embodiment: provides a download center device (a firmware distributing device in claims 10, which registers and controls modified firmware; connects terminal devices 18-1 to 18-5 to the download center device 10 via a network 12; sets, as scheduled time, predetermined scheduled time of download of firmware at the side of the terminal devices 18-1 to 18-5, for example, particular time of a particular day of the week if it is once a week; automatically carries out a download request with respect to the download center device 10 at the time of the day of the week; downloads latest firmware if there is the latest firmware, that is, unupdated firmware; and applies it to the devices. In the present embodiment, the terminal devices 18-1 to 18-5 are connected to a network 16-1 of a site 14-1. Therefore, the terminal devices 18-1 to 18-3 share the same communication line when firmware is downloaded from the download center device 10. The terminal devices 18-4 and 18-5 are connected to a network 16-2 of a site 14-2 of another customer. The terminal devices 18-4 and 18-5 also share the same communication line when firmware is downloaded from the download center device 10. Furthermore, a firmware registering device 20 is connected to the download center device 10 via the network 12. The firmware registering device 20 transmits and registers modified firmware to the web server side of the download center device 10 by a browser function, and this is distributed with respect to the download requests from the terminal devices 18-1 to 18-5.

Figure 2:
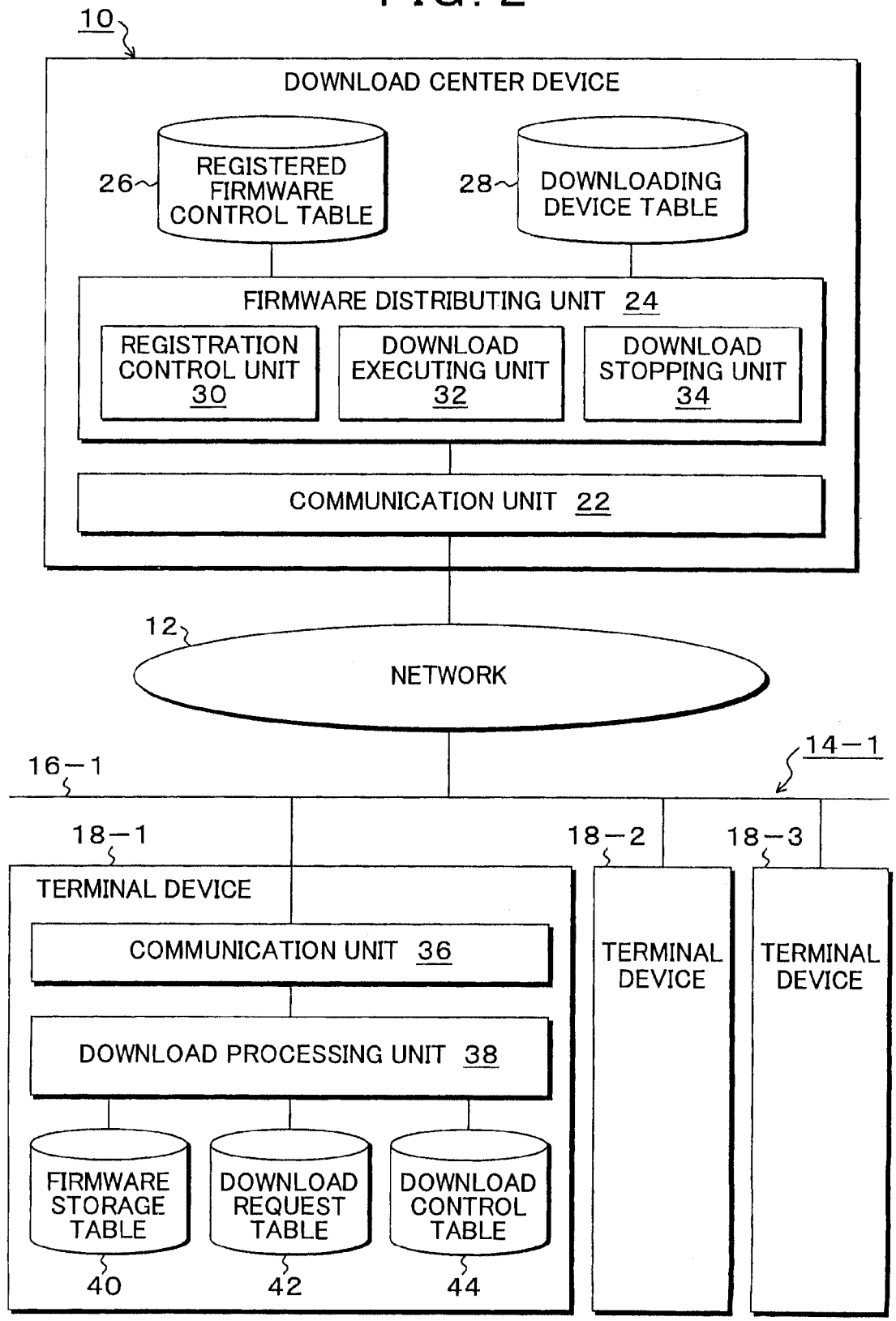
FIG. 2 is a block diagram showing a functional configuration of a download center device and terminal devices of the present embodiment.

FIG. 2 is a block diagram showing a functional configuration of the download center device and the terminal devices of the first embodiment. In FIG. 2, the download center device 10 is provided with a communication unit 22 and a firmware distributing unit 24. A registered firmware control table 26 and a downloading device table 28 are provided for the firmware distributing unit 24. The firmware distributing unit 24 is provided with a registration control unit 30, a download executing unit 32, and a download stopping unit 34 as the functions which are realized by execution of programs. On the other hand, each of the terminal devices 18-1 to 18-3 connected via the network 12 is provided with a communication unit 36, a download processing unit 38, a firmware storage table 40, a download request table 42, and a download control table 44, as representatively shown in the terminal device 18-1. Note that, in FIG. 2, the terminal devices 18-1 to 18-3 provided in the site 14-1 of FIG. 1 are focused on and shown. However, the terminal devices 18-4 and 18-5 provided in the other site 14-2 also have the same functional configuration. The registration control unit 30 provided in the firmware distributing unit 24 of the download center device 10 registers the modified firmware, which is provided from the firmware registering device of FIG. 1, to the registered firmware control table 26 and controls the firmware. When a download request is received from the side of the terminal devices 18-1 to 18-3, the download executing unit 32 determines unupdated firmware by referencing the registered firmware control table 26 and downloads this to the terminal device which is the source of the request. The determination of the unupdated firmware carried out by the download executing unit 32 determines the unupdated firmware by comparing the updated firmware information which is obtained from the download request from the terminal device with the registered firmware information of the registered firmware control table 26 which is controlled by the registration control unit 30, specifically, comparing the firmware version number of the updated firmware information with the firmware version number of the registered firmware. When the download request is received, the download executing unit 32 also responds by transmitting a latest resource notification which is list information of the unupdated firmware which is acquired from the registered firmware control table 26. The terminal device which received the list information of the unupdated firmware requests download in the firmware unit based on the list information and sequentially downloads the unupdated firmware list information which is shown in a list. When such download in the firmware unit has to be interrupted or stopped while the download is being executed, the process is interrupted or stopped when download of the currently-executed firmware is completed, and the firmware remaining in the list display can be downloaded later by download requests. The download stopping unit 34 acquires user identification information which identifies the customer that is obtained from the download request from the terminal device-side and, if the user identification information which identifies the customer is matched with the user identification information which identifies the customer of another terminal device which is already carrying out download, responds that there is no unupdated firmware and stops download even if unupdated firmware is present in the registered firmware control table 26. The terminal devices 18-1 to 18-3 disposed in the site 14-1 owned by the same customer have the same user identification information; for example, if the other terminal devices 18-2 and 18-3 are currently executing download when a download request is received from the terminal device 18-1, the requested user identification information and the user identification information executing the download are matched with each other, and the function by the download stopping unit 34 can determine that a plurality of download requests have been sent from the same site 14-1 sharing the communication line. In such a case, in order to avoid overlapping of the download that shares the same communication line, even when unupdated firmware is present, a response of no unupdated firmware is made with respect to the download request so as to stop the download. As a result, overlapping of the download of the terminal devices 18-1 to 18-3 of the site 14-1 sharing the communication line can be avoided, and timeout due to long download time or wasteful occupation of resources at the download center device 10-side can be prevented.

Figure 3:
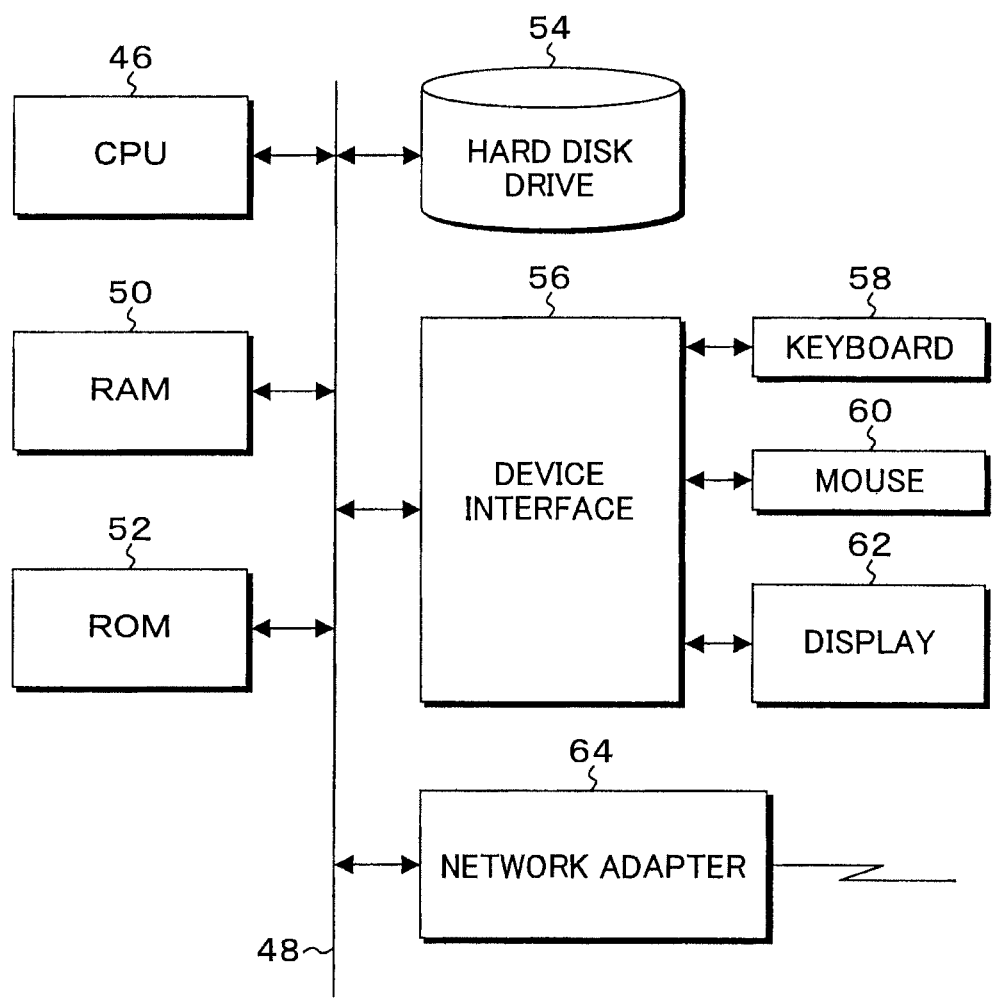
FIG. 3 is a block diagram showing a hardware environment of a computer which executes the programs of the download center device of the present embodiment.

FIG. 3 is a block diagram showing a hardware environment of a computer which executes the programs of the download center device of the present embodiment. In FIG. 3, a RAM 50; a ROM 52; a hard disk drive 54; a device interface 56 connecting a keyboard 58, a mouse 60, and a display 62; and a network adapter 64 are connected to a bus 48 of a CPU 46. In the hard disk drive 54, a firmware distributing program which realizes the functions of the firmware distributing unit 24 provided in the download center device of the present embodiment is installed. When the computer is started up, after initialization and diagnosis processes by BIOS are carried out, a boot program of the ROM 52 is executed, thereby reading an OS from the hard disk drive 54, placing the OS in the RAM 50, and executing the OS by the CPU 46. Along with the execution of the OS by the CPU 46, the firmware distributing program of the present embodiment is read from the hard disk drive 54, placed in the RAM 52, and executed by the CPU 46. Note that the hardware environment of the computer of FIG. 3 is also similar at the side of the terminal devices 18-1 to 18-3 shown in FIG. 2.

Figure 4:
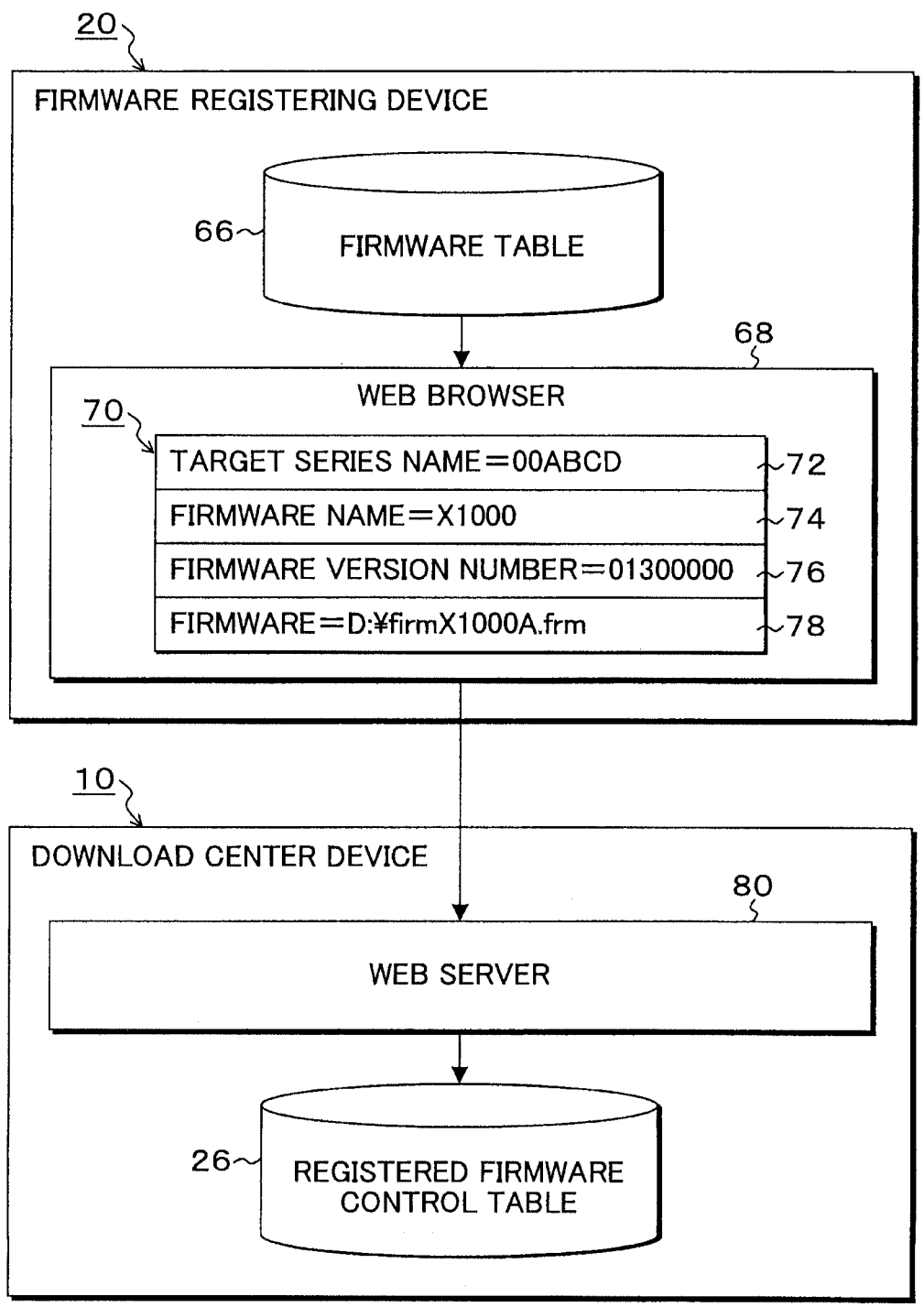
FIG. 4 is an explanatory diagram showing a process of registering modified firmware to the download center device by a firmware registering device of the present embodiment.

FIG. 4 is an explanatory diagram showing a process of registering modified firmware to the download center device by the firmware registering device of the present embodiment. In FIG. 4, when firmware of hardware which is modification of the firmware applied at the terminal device-side is to be registered to the download center device 10, the modified latest firmware is stored in a firmware table 66 of the firmware registering device 66, the firmware is then downloaded together with download information 70 to the web server 80 of the download center device 10 via a web browser 68 and registered to the registered firmware control table 26. The download information 70 of the firmware registered from the firmware registering device 20 comprises a target series name 72, firmware name 74, firmware version number 76, and the firmware 78. As a matter of course, the information may be registered to the registered firmware control table 26 not only by the registration by the web browser of the firmware registering device 20, but also by directly setting a portable medium such as a CD-ROM in the computer of the download center device 10.

FIG. 5 is an explanatory diagram showing the registered firmware control table 26 provided in the download center device 10 in the present embodiment. In FIG. 5, the registered firmware control table 26 registers plural pieces of firmware information, wherein one record comprises the target series name, firmware name, firmware version number, and the firmware which is the actual body.

Figure 6:
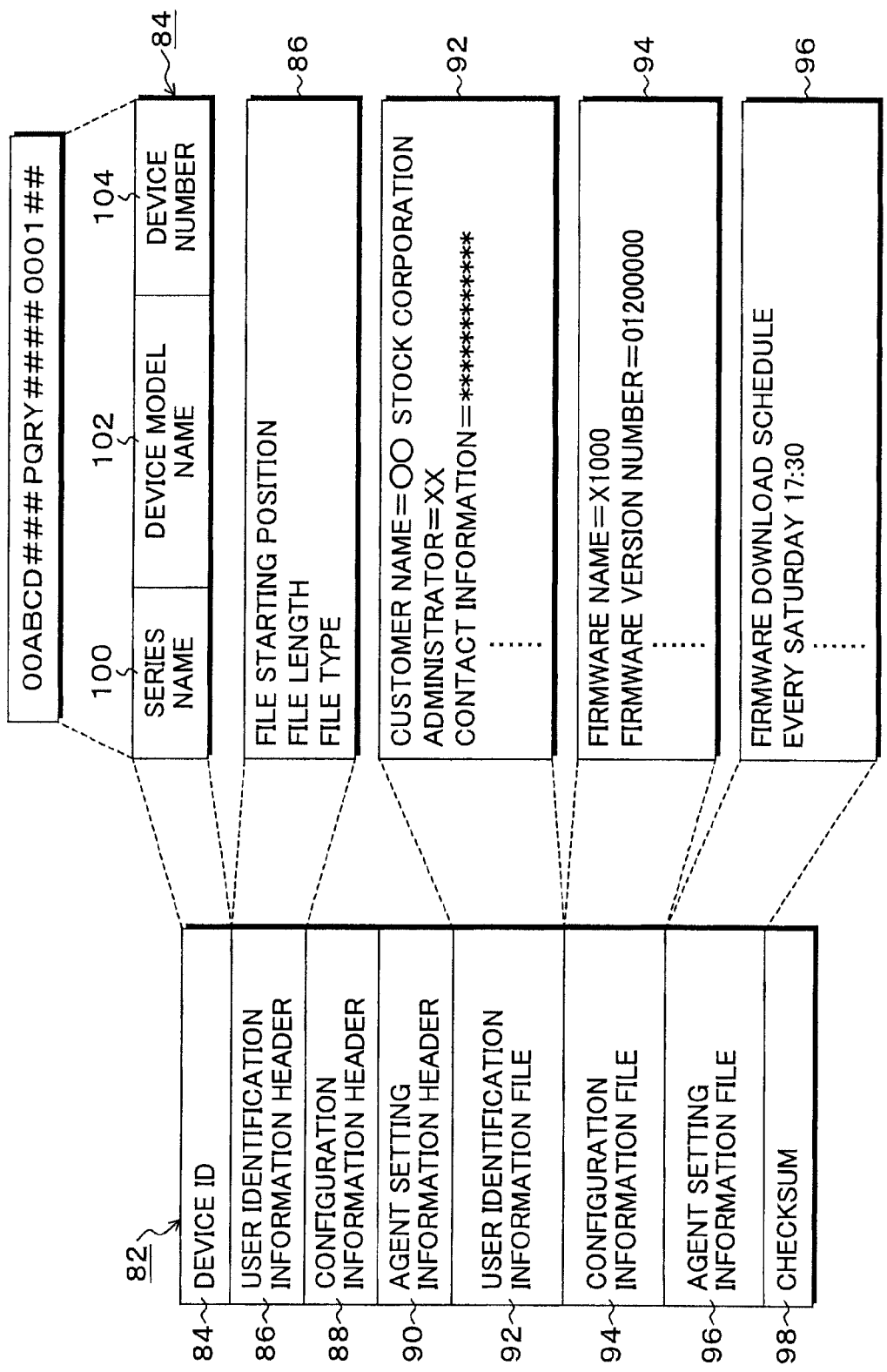
FIG. 6 is an explanatory diagram showing the data structure of a download request in the present embodiment.

FIG. 6 is an explanatory diagram showing the data structure of the download request in the present embodiment. In FIG. 6, the data structure of the download request 82 transmitted from the terminal device-side comprises a device ID 84, user identification information header 86, configuration information header 88, agent set information header 90, user identification information file 92, configuration information file 94, agent set information file 96, and checksum 98. The device ID 84 includes, as extracted to and shown in the right side, a series name 100, a device model name 102, and device number 104. Specifically, the device ID is, as extracted to and shown above there, "00ABCD###PQRY####001###", wherein the series name 100 is "00ABCD", the device model name 102 is "PQRY", and the device number 104 is "001". The user identification information header 106 defines a file starting position, file length, and file type for the user identification information file 92 corresponding to the header. The configuration information header 88 and the agent set information header 90 also similarly define file starting positions, file lengths, and file types specifying the corresponding configuration information file 94 and the agent set information file 96, respectively. The user identification information file 92 registers user identification information such as a customer name, administrator, and contact information. When there are a plurality of download requests, whether they are the download requests from the same customer name, that is, the same site sharing a communication line can be determined by referencing the customer name of the user identification information file 92. In the configuration information file 94, the firmware name and the firmware version number are described.

The firmware name and the firmware version number are registration items of the registered firmware control table 26 shown in FIG. 5. When the download request is received from the terminal device, the firmware version number is utilized to determine whether unupdated firmware is present. More specifically, the firmware version number of the registered firmware control table 26 and the updated firmware house in the terminal device obtained from the download request are compared with each other. If the firmware version number in the registered firmware control table 26 is larger, it is determined that unupdated firmware (latest resource information) is present, and a latest resource notification including the list information of the unupdated firmware is responded. In the agent set information file 96, as the scheduled time of firmware download, for example, "EVERY SATURDAY 17:30" is set. The scheduled time of firmware download is controlled at the terminal device-side. When it reaches the set time, download is automatically requested to the download center device 10, and unupdated firmware is downloaded. On the other hand, the download requests from the terminal devices include a download request of an operator operation which is carried out by an operator in accordance with needs. Also in the case of the download request of the operator operation, the download request 82 having the data structure of FIG. 6 is transmitted, and the scheduled time of firmware download in the terminal device can be acquired by referencing the agent set information file 96 therein. Then, the scheduled time and the time at which the download request is actually received is compared with each other. If both of them are matched with each other, it can be determined to be a request according to the download schedule. On the other hand, if they are unmatched, it is determined to be a download request by the operator operation.

Figure 7:
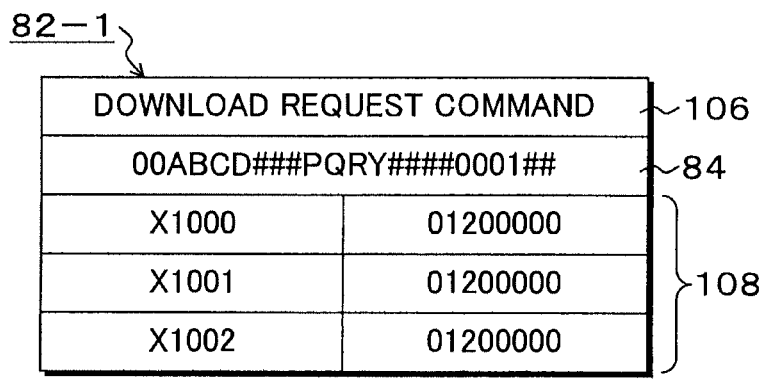
FIG. 7 is an explanatory diagram showing an outline of the download request in the present embodiment.

FIG. 7 is an explanatory diagram showing an outline of the download request in the present embodiment. The download request 82-1 of FIG. 7 which is schematically shown includes a download request command 106, the device ID 84, and three pieces of updated firmware information 108, each of which comprising a combination of a firmware name and a firmware version number. The firmware version number of the updated firmware information 108 and the firmware version number of the registered firmware information file 26 of FIG. 5 are compared with each other. If the firmware version number of the registered firmware control table 26 is larger, it is determined that unupdated firmware (latest resource) is present.

Figure 8:
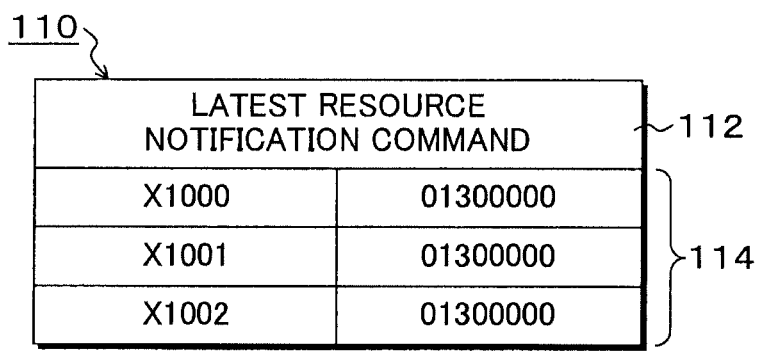
FIG. 8 is an explanatory diagram showing a latest resource notification in the present embodiment.

FIG. 8 is an explanatory diagram showing the latest resource notification in the present embodiment. The latest resource notification 110 of FIG. 8 transmits determined unupdated firmware information 114 together with a latest resource notification command 112 with respect to the download request from the terminal device when the presence of the latest firmware having a large firmware version number is determined from the firmware control table 26. If the download request 82-1 of FIG. 7 is received from the terminal device, the firmware version number "01200000" in the right side of the updated firmware information 108 and the firmware version number "01300000" of the registered firmware control table 26 of FIG. 5 are compared with each other. Since the version number of the registered firmware control table 26 is larger, this one is determined to be the latest firmware, and the latest resource notification 108 of FIG. 8 is caused to include three pieces of the unupdated firmware information 114 combining the firmware names and the firmware version numbers thereof as list information and is responded to the terminal device.

Figure 9:
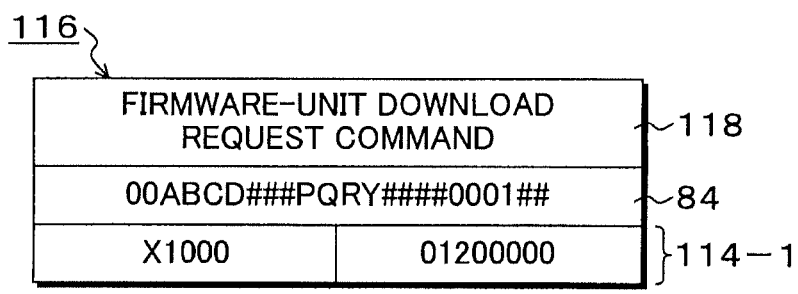
FIG. 9 is an explanatory diagram showing a firmware-unit download request in the present embodiment.

FIG. 9 is an explanatory diagram showing a firmware-unit download request from the terminal device in the present embodiment. In FIG. 9, the firmware-unit download request 116 places the device ID 84 subsequent to a firmware-unit download request command 118 and then places firmware information 114-1 comprising a combination of the firmware name and the firmware version number of, for example, the first firmware at the top of the three sets of firmware obtained from the latest resource notification 110 of FIG. 8. The terminal device that has received the latest resource notification 110 of FIG. 8 transmits the firmware-unit download request 118 of FIG. 9 to the download center device 10 in a firmware unit that is taken from the plural pieces of the unupdated firmware information 114, thereby sequentially downloading them. Therefore, when an order of, for example, forcible termination is received during download of certain firmware, the process is stopped at the point when the download of the firmware is finished, and the remaining firmware of the list display can be downloaded by a next download request.

FIG. 10 is an explanatory diagram showing a download termination notification in the terminal device of the present embodiment. In FIG. 10, the download termination notification 120 comprises a download termination notification command 122 and the device ID 84. With respect to the list of the unupdated firmware 114 according to the latest resource notification 110 shown in FIG. 8, when the firmware-unit download requests 116 as shown in FIG. 9 are sequentially carried out and download of all the firmware is finished, the download termination notification 120 is transmitted to the download center device 10, thereby terminating the processes accompanying the series of download requests.

FIG. 11 is an explanatory diagram of the downloading device table 28 provided in the download center device 10 of the present embodiment. In FIG. 11, the downloading device table 28 comprises the device IDs and customer names and registers and controls the names of the customers owning the terminal devices which are currently executing download until the download is terminated. The downloading device table 28 is referenced when a download request is newly received from the terminal device-side. If the customer name obtained from the download request and the customer name registered in the downloading device table 28 are matched, a response that there is no unupdated firmware is made so as to stop download by the function of the download stopping unit 34 shown in FIG. 2, even when unupdated firmware is registered in the registered firmware control table 26.

FIG. 12 is an explanatory diagram showing the download control table used in the terminal device of the present embodiment. In FIG. 12, the download control table 44 comprises the firmware name, firmware version number, and download state. In the download control table 44, the firmware names and the firmware version numbers of the firmware obtained from the received unupdated firmware 114 are registered when the latest resource notification 110 shown in FIG. 8 is transmitted from the download center device 10, and the download state is changed to "FINISHED" when the firmware-unit download 116 shown in FIG. 9 is transmitted and the download of the corresponding firmware is completed. When the download of all the firmware displayed in the list is terminated and the download termination notification 120 shown in FIG. 10 is transmitted, the download control table 44 of FIG. 12 is erased.

Figure 13:
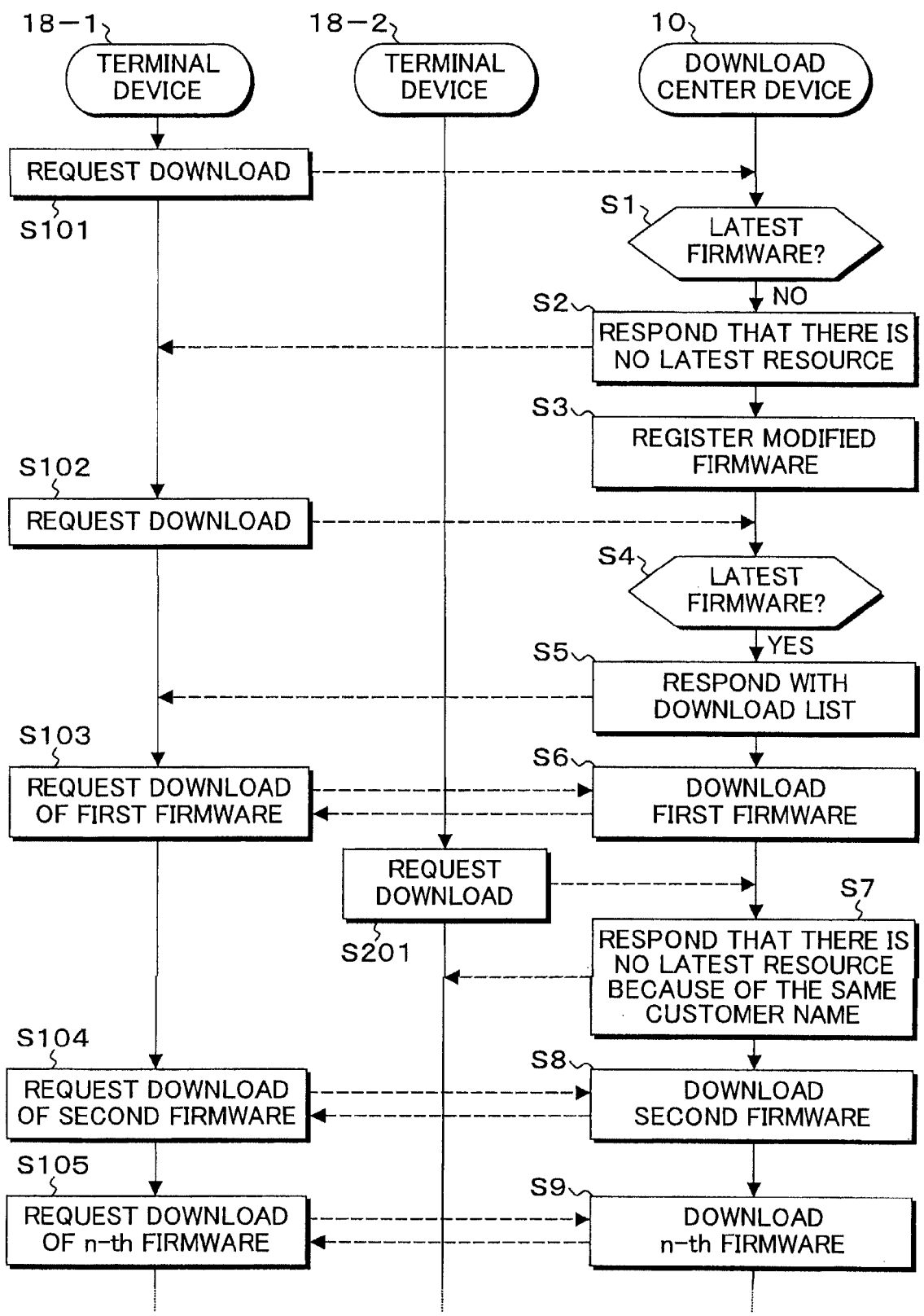
FIG. 13 is a time chart showing download processes of firmware in the embodiment of FIG. 2.
Figure 17B:
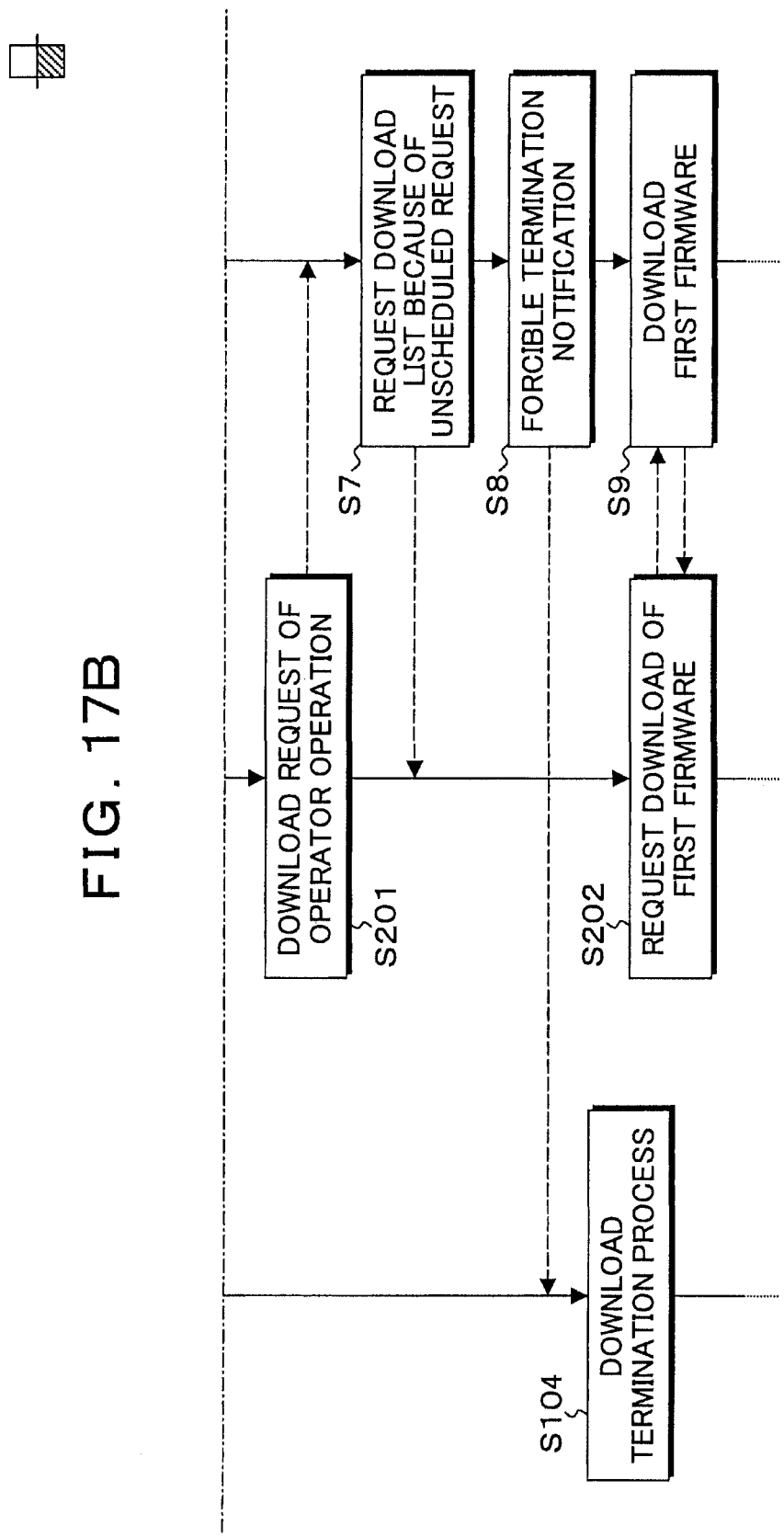
Figure 18B:
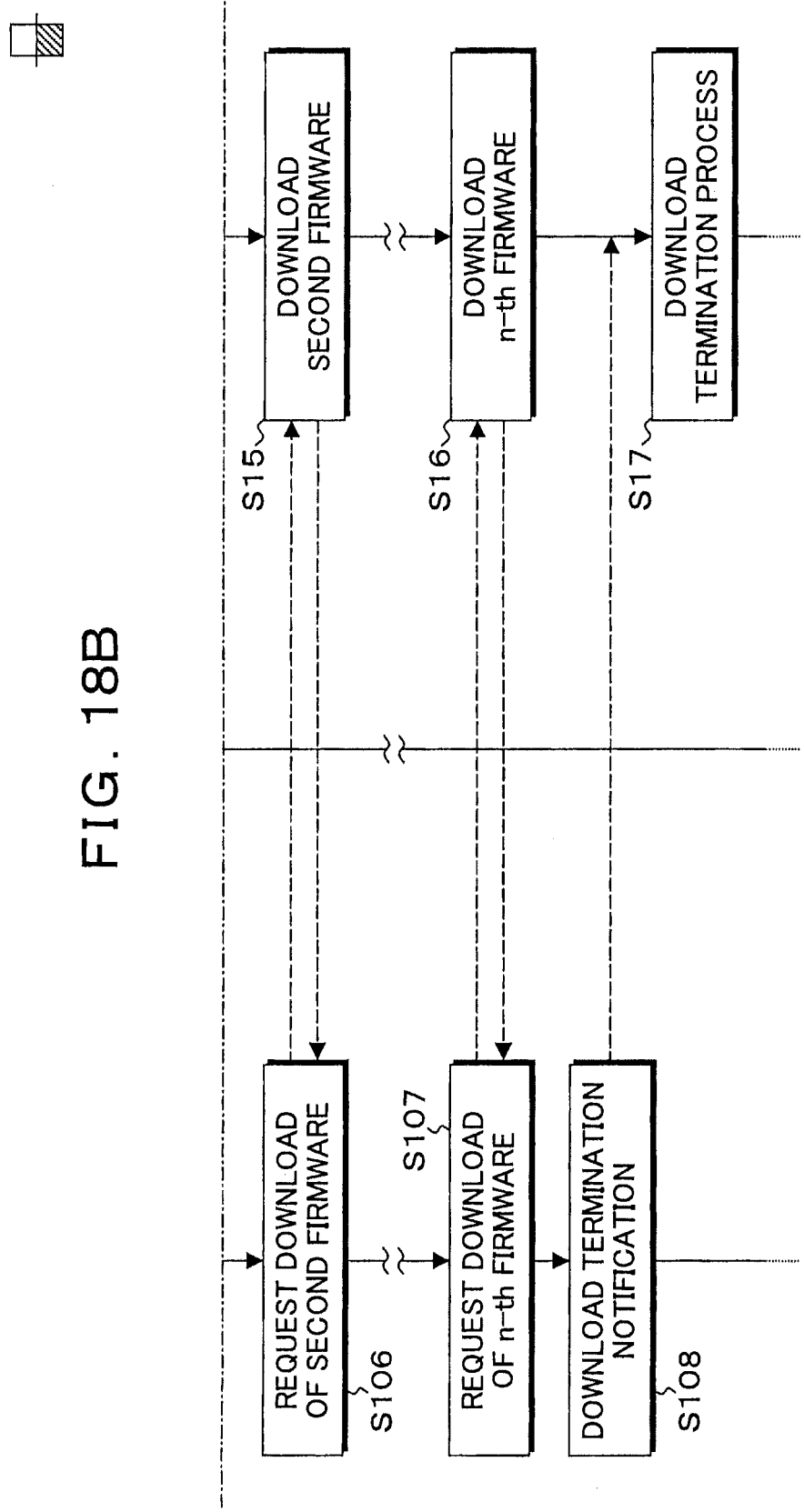

FIG. 13 is a time chart showing download processes of firmware in the embodiment of FIG. 2, wherein the download processes of the terminal devices 18-1 and 18-2, which share the communication line provided in the site 14-1, and the download center device 10 are taken as an example. In FIG. 13, it is assumed that the terminal device 18-1 transmits the download request to the download center device 10 at step S101. The download center device 10 which has received the download request determines whether there is latest firmware at step S1. More specifically, the download request 82-1 shown in FIGS. 17A and 17B is transmitted from the terminal device 18-1. Since the updated firmware 108 is contained therein, the firmware version number therein and the firmware version number of the registered firmware control table 26 shown in FIG. 5 are compared with each other. It is determined that latest firmware is present if the firmware version number of the registered firmware control table 26 is large, or it is determined that there is no latest firmware if the version numbers are equal to or smaller than the firmware version number of the table. In this case, it is determined at step S1 that there is no latest firmware since the firmware version number of the registered firmware control table 26 is equal to or smaller than the updated firmware version number obtained from the download request. Therefore, at step S2, the download center device 10 responds to the terminal device 18-1 that there is no latest resource. Then, at step S3, it is assumed that latest modified firmware is registered from the firmware registering device 20 to the download center device 10 in the manner shown in FIG. 4. Subsequently, when the terminal device 18-1 requests download in accordance with the schedule of download at step S102, it is determined at step S4 that the modified firmware is present since the modified firmware has been registered; and, at step S5, the download list shown in the latest resource notification 110 as shown in FIG. 8 is responded. At step S103, the terminal device 18-1 which has received the response of the download list creates the download control table 44 as shown in FIG. 12 and requests the download center device 10 to download the first firmware at the top of the table at step S103. The download request has the format of the firm-unit download request 116 shown in FIG. 9. At step S6, the download center device 10 which has received the download request of the first firmware reads the corresponding first firmware from the registered firmware control table 26 and transmits, thereby downloading it. When the download of the first firmware is executed, the download center device 10 registers the device ID of the terminal device 18-1, which is currently executing the download, and the customer name, which is obtained from the download request, to the downloading device table 28 shown in FIG. 11. Subsequently, at step S201, it is assumed that another terminal device 18-2 transmits a download request. Then, at step S7, the download center device 10 references the downloading device table 28 of FIG. 11 by using the customer name obtained from the download request and, since it is matched with the customer name of the terminal device 18-1 in this case, returns a response of no latest resource to the terminal device 18-1 even when there is latest firmware due to the same customer name. Therefore, even when the terminal device 18-2 requests download at step S201, latest firmware is not downloaded, and the process is stopped. Subsequently, the terminal device 18-1 requests download of second firmware at step S104, the download center device 10 downloads the second firmware thereto at step S8, and the download of n-th firmware which is the last one in the download list is requested thereafter at step S105. In response to this, the n-th firmware is downloaded from the download center device 10 at step S9, and the download of the series of the firmware with respect to the download requested by the terminal device 18-1 is terminated at step S102. In this manner, in the embodiment of FIG. 2, when the download request is received from the other terminal device 18-2 while the download of the firmware to the terminal device 18-1 is being executed, if the customer name obtained from the download request is matched with the customer name of the terminal device 18-1, which is already executing download, the download request is determined to be the download request from the terminal device 18-2 that belongs to the same customer site sharing the communication line, and the response of no unupdated firmware is made even when there is unupdated firmware, so that the download of the terminal devices 18-1 and 18-2 sharing the communication line is not overlapped.

Figure 14A:
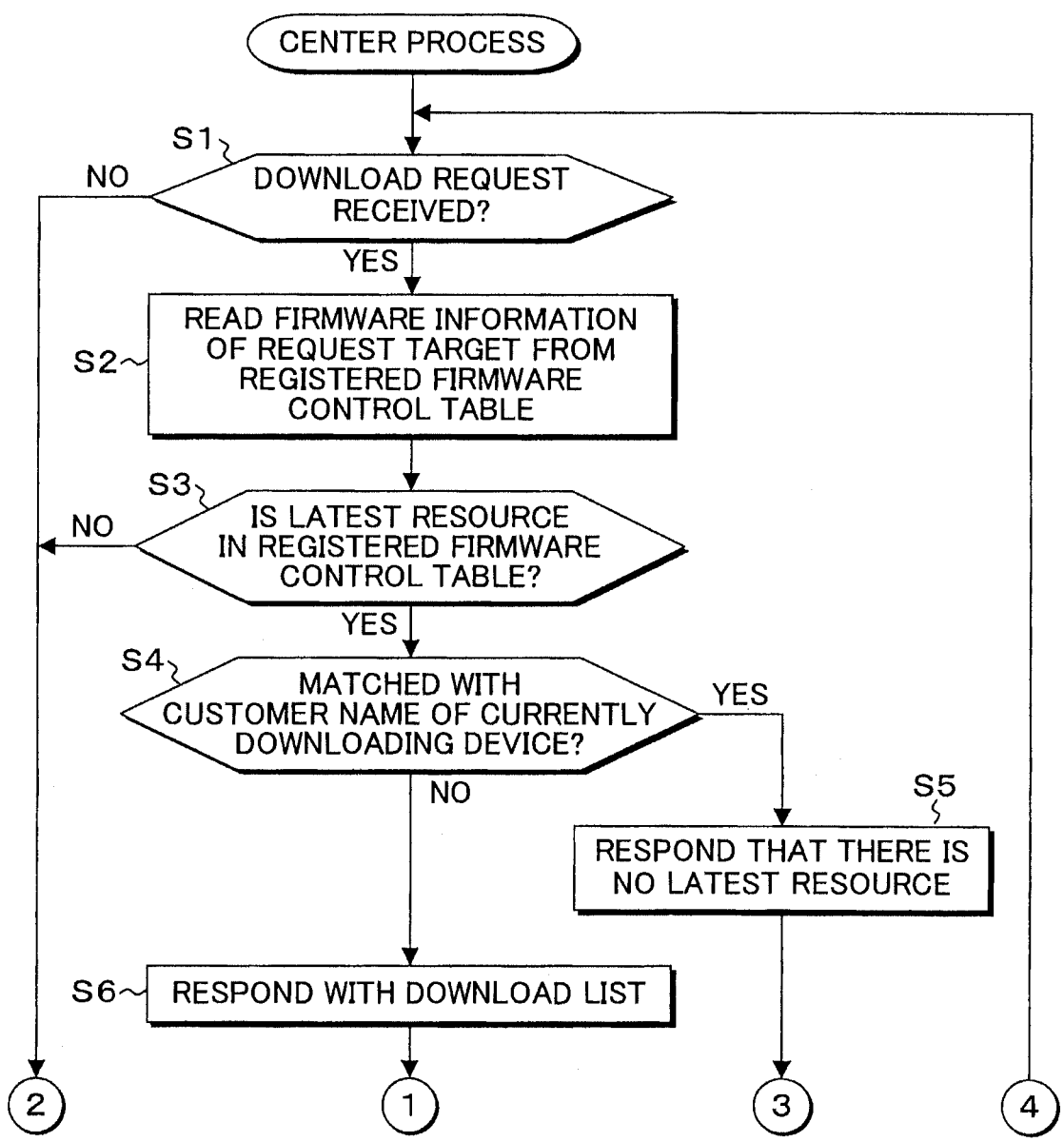
FIGS. 14A and 14B are flow charts showing a center process of the download center device in the embodiment of FIG. 2.
Figure 14B:
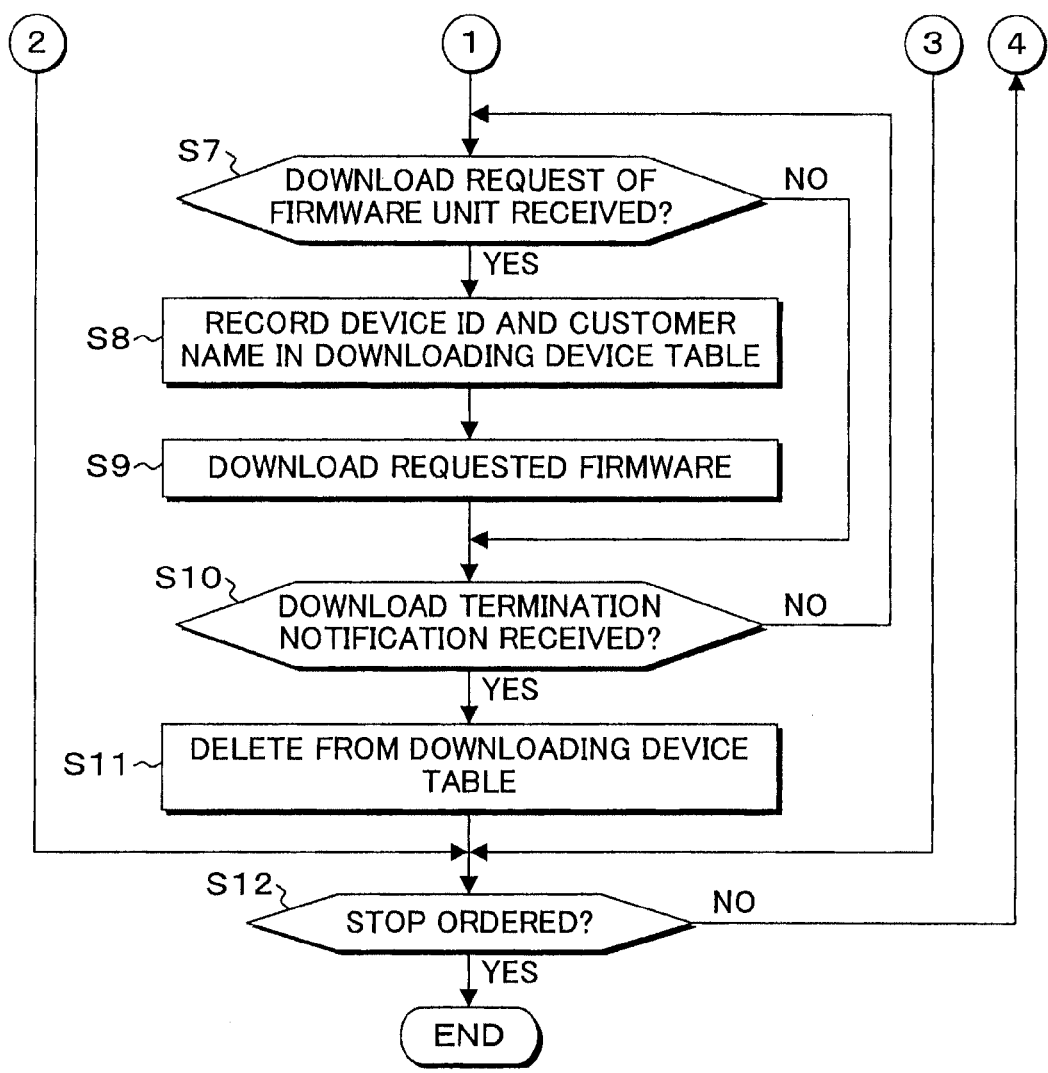

FIGS. 14A and 14B are flow charts showing a center process of the download center device 10 in the embodiment of FIG. 2. In FIGS. 14A and 14B, in the center process, presence of reception of a download request from the terminal devices is checked at step S1; when the download request is received, the series name that specifies a request target is extracted from the download request at step S2; the registered firmware control table 26 of FIG. 5 is referenced in accordance with the series name; and the firmware version number is read as firmware information. Subsequently, at step S3, the firmware version number read at step S2 from the firmware control table 26 and the firmware house of the updated firmware obtained from the download request are compared with each other, and whether there is a latest resource in the registered firmware table is determined at step S3 by checking whether the firmware version number is larger. If the firmware version number of the registered firmware control table is larger, it is determined that there is a latest resource, and whether the currently downloading customer name and the customer name obtained from the download request are matched is determined at step S4. In this case, the downloading device table 28 of FIG. 11 is referenced, the customer name of the device that is currently carrying out download is acquired, and it is compared with the customer name that is obtained from the download request. When the currently downloading customer name and the customer name of the download request are matched, the process proceeds to step S5, and the response that there is no latest resource is made. On the other hand, if the customer names are unmatched at step S4, a download list comprising the latest resource notification 110 shown in FIG. 8 is created, and a response is made with it at step S6. Subsequently, if the download request in the firmware unit from the terminal device-side is received is checked at step S7. When it is received, the device ID and the customer name are recorded in the downloading device table 28 of FIG. 11 at step S8. Then, download of the requested firmware is checked at step S9. Subsequently, if a download termination notification is received is checked at step S10. If not received, the process returns to step 7, and waits the next download request in the firmware unit. When all the firmware in the download list is downloaded at the terminal device-side, the download termination notification is transmitted. Therefore, when it is received at step S10, the process proceeds to step S11, the device ID and the device name are deleted from the downloading device table of FIG. 11, and the process with respect to the download request is terminated.

Such processes of steps S1 to S11 are repeated until stop is ordered at step S12.

Figure 15:
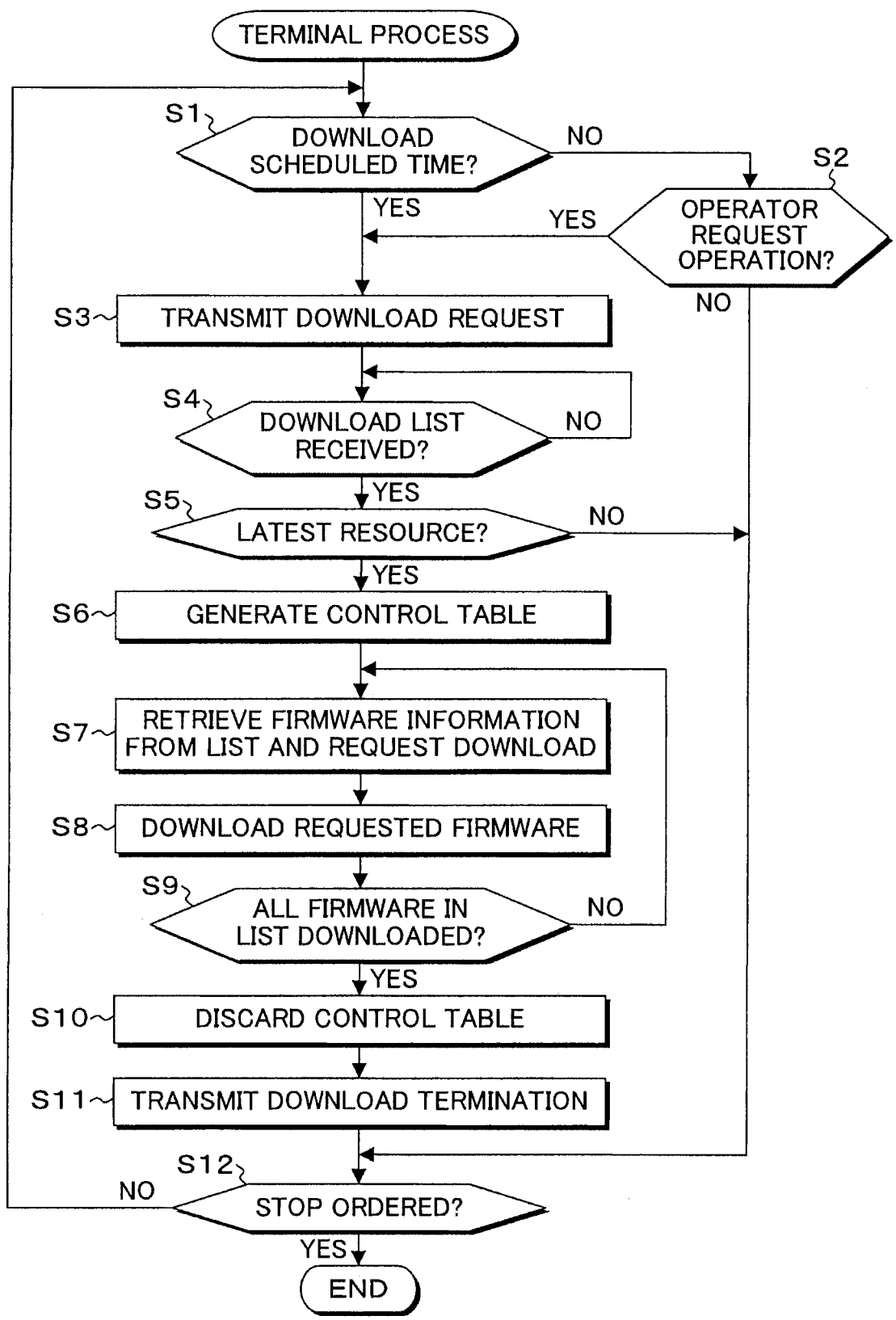
FIG. 15 is a flow chart showing a terminal process of the terminal device in the embodiment of FIG. 2.

FIG. 15 is a flow chart showing a terminal process of the terminal device in the embodiment of FIG. 2. In FIG. 15, in the terminal process, whether it is the scheduled time of download, which is set in advance, is determined at step S1, the process proceeds to step S3 when it reaches the scheduled time, and the download request is transmitted. If it is not the scheduled time, if there is an operator request operation is checked at step S2. If there is the operator request operation, the process also proceeds to step S3, and the download request is transmitted. When a download list is received at step S4 from the download center device with respect to transmission of the download request, the process proceeds to step S5, and if there is a latest resource is checked from the contents of the download list. If there is a latest resource, the download control table 44 shown in FIG. 12 is generated at step S6. Then, at step S7, one piece of the firmware information is retrieved from the list, and the firmware-unit download request 116 shown in FIG. 9 is transmitted; and the requested firmware is downloaded at step S8. Subsequently, at step S9, whether all the firmware of the list has been downloaded is checked. If not all of the firmware have not been downloaded, the process from step S7 is repeated. When download of all the firmware is finished, the download control table is discarded at step S10, and then, the download termination notification 120 shown in FIG. 10 is transmitted at step S11, thereby terminating the download request response process at the download center device-side. Such processes of steps S1 to S11 are repeated until stop is ordered at step S12.

Figure 16:
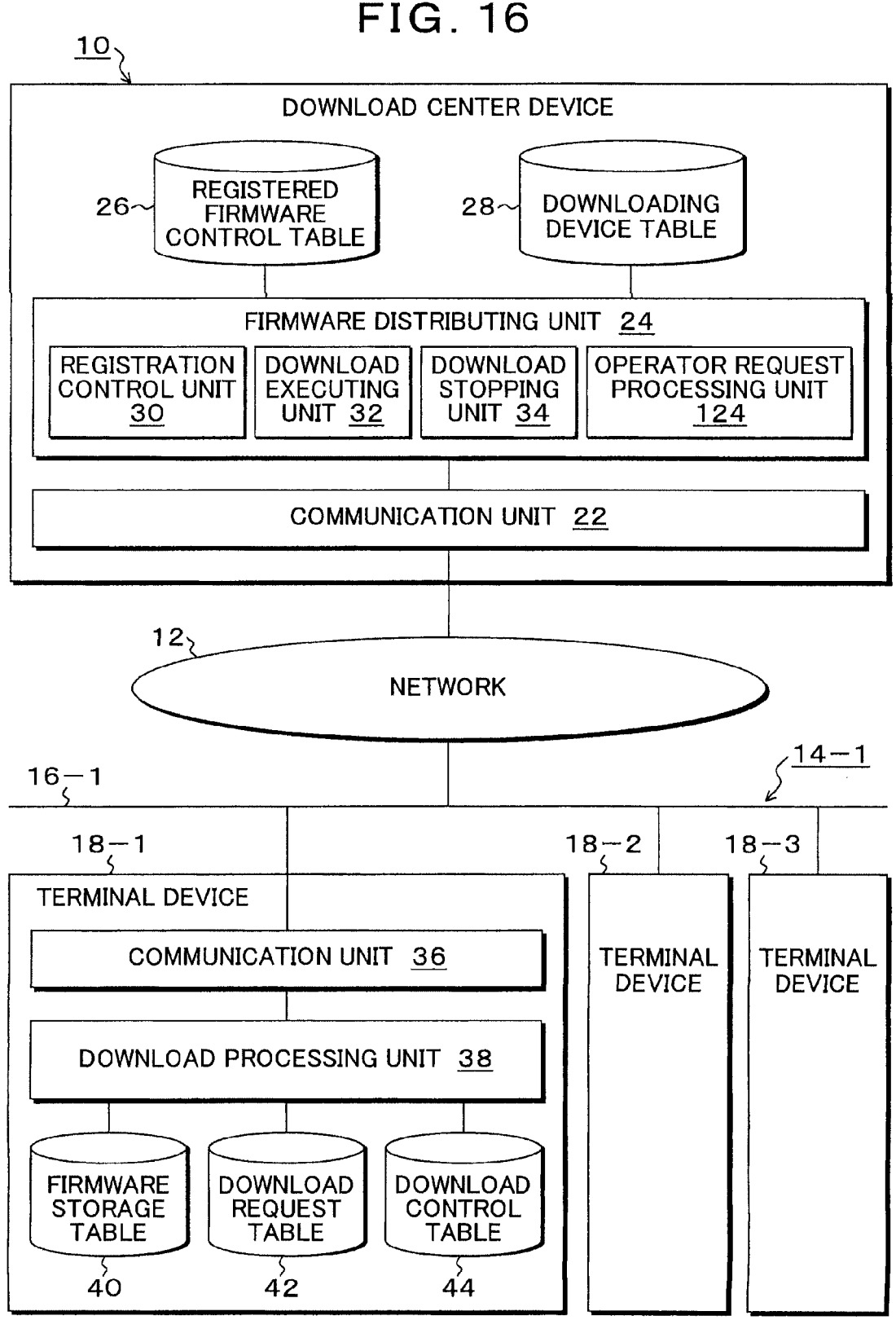
FIG. 16 is a block diagram showing a functional configuration of a download center device and terminal devices of another embodiment.

FIG. 16 is a block diagram showing a functional configuration of a download center device and terminal devices in a second embodiment.

In FIG. 6, the download center device 10 has the communication unit 22, the firmware distributing unit 24, the registered firmware control table 26, and the downloading device table 28; the firmware distributing unit 24 is provided with the registration control unit 30, the download executing unit 32, and the download stopping unit 34; and these points are the same as the embodiment of FIG. 2. In addition to these, in the second embodiment of FIG. 16, an operator request processing unit 124 is further provided. When the operator request processing unit 124 determines that the download request received from the terminal device-side is the download request by an operator operation, the operator request processing unit 124 cancels the download stop that is to be carried out by the download stopping unit 34 even when the customer names are the same, causes the download executing unit 32 to execute download, and transmits the forcible termination notification to the other terminal device(s) which is already executing download so as to stop the download in the process. In order to determine whether the download request in the operator request processing unit 124 is the download request automatically made by the firmware download schedule or the download request made by an operator operation, the scheduled time, for example "EVERY SATURDAY 17:30", of firmware download obtained from the agent set information file 96 in the data structure of the download request 82 shown in FIG. 6 and the actual download requested time is compared with each other. If they are not matched, it is determined to be the download request by an operator operation. When the download request of the operator operation is determined in this manner, even when download is being executed by the other terminal device which belongs to the same site and shares the communication line, download is started in order to prioritize and immediately process the download request made by the operator operation. At the same time, the forcible termination notification is transmitted to the other currently-executing terminal so as to stop the download, the download request accompanying the operator operation is prioritized and executed, and the download of the other terminal device is forcibly stopped, so that download is not mutually overlapped. Note that the side of the terminal devices 18-1 to 18-3 has the same functional configuration as the embodiment of FIG. 2 as shown in the terminal device 18-1.

FIGS. 17A, 17B, 18A and 18B are time charts showing download processes of firmware in the second embodiment of FIG. 16, wherein the download processes of the terminal devices 18-1 and 18-2, which belong to the same site, and the download center device 10 are taken as an example.

106 In FIGS. 17A and 17B, the processes of steps S101, S102, and 5103 of the terminal device 18-1 and steps S1 to S6 of the download center device 10 corresponding thereto are the same as the case of the first embodiment shown in FIG. 3. It is assumed that the other terminal device 18-2 that belongs to the same site requests download by an operator operation at step S201 during execution of the download at step S6 wherein the download center device 10 downloads the first firmware with respect to the download request of the first firmware of the terminal device 18-1 at step S103. With respect to the download request from the terminal device 18-2, the download center device 10 compares the scheduled time, which is obtained from the download request, with the actual request time. When they are not matched, the download center device 10 determines that it is a download request of an operator operation, that is, an unscheduled request, and makes a response with a download list that indicates there is a latest resource even when it is the download request of the same device name as the terminal device 18-1, which is currently executing download. Subsequently, at step S8, the forcible termination notification is transmitted to the terminal device 18-1, which is currently executing download. In response to this, the terminal device 18-1 executes a download termination process at step S104, and, for example, in the case in which the first firmware to the n-th firmware has been notified as the latest resources as the download list transmitted at step S5, the download is interrupted by the download of the first firmware at the beginning. Subsequently, the terminal device 18-2 which requested download by the operator operation requests download of first firmware at step S202, and the download center device 10 downloads the first firmware to the terminal device 18-2 at step S9. Subsequently, the process proceeds to FIGS. 18A and 18B, the terminal device 18-2 requests download of the remaining second firmware to the last n-th firmware in the firmware-unit from step S203 to S204. In response to this, the download center device 10 executes download in the firmware unit with respect to each of the requests from step S10 to S10. When the download of the last n-th firmware is finished at step S204, the download termination request is notified at step S205. In response to this, at step S12, the download center device 10 executes a download termination process of terminating the series of processes with respect to the download request received at step S201 from the terminal device 18-2. Then, regarding the terminal device 18-1 which has interrupted download in response to the forcible termination notification at step S104, when the download request is transmitted at step S105 at the point it reaches the scheduled time, the download center device 10 determines that latest firmware is present at step S13 since the second firmware to the n-th firmware has not been updated and transmits a download list including the second firmware to the n-th firmware at step S14. In response to this, the terminal device 18-1 requests download of the second firmware to the last n-th firmware from step S106 to step S107, and the download center device 10 executes the download of the second firmware to the last n-th firmware in the firmware unit from step S15 to S16. Then, the terminal device 18-1 transmits the download termination notification at step S108, and the download center device 10 executes a download termination process at step S17 with respect to the download request of step S105.

Figure 19A:
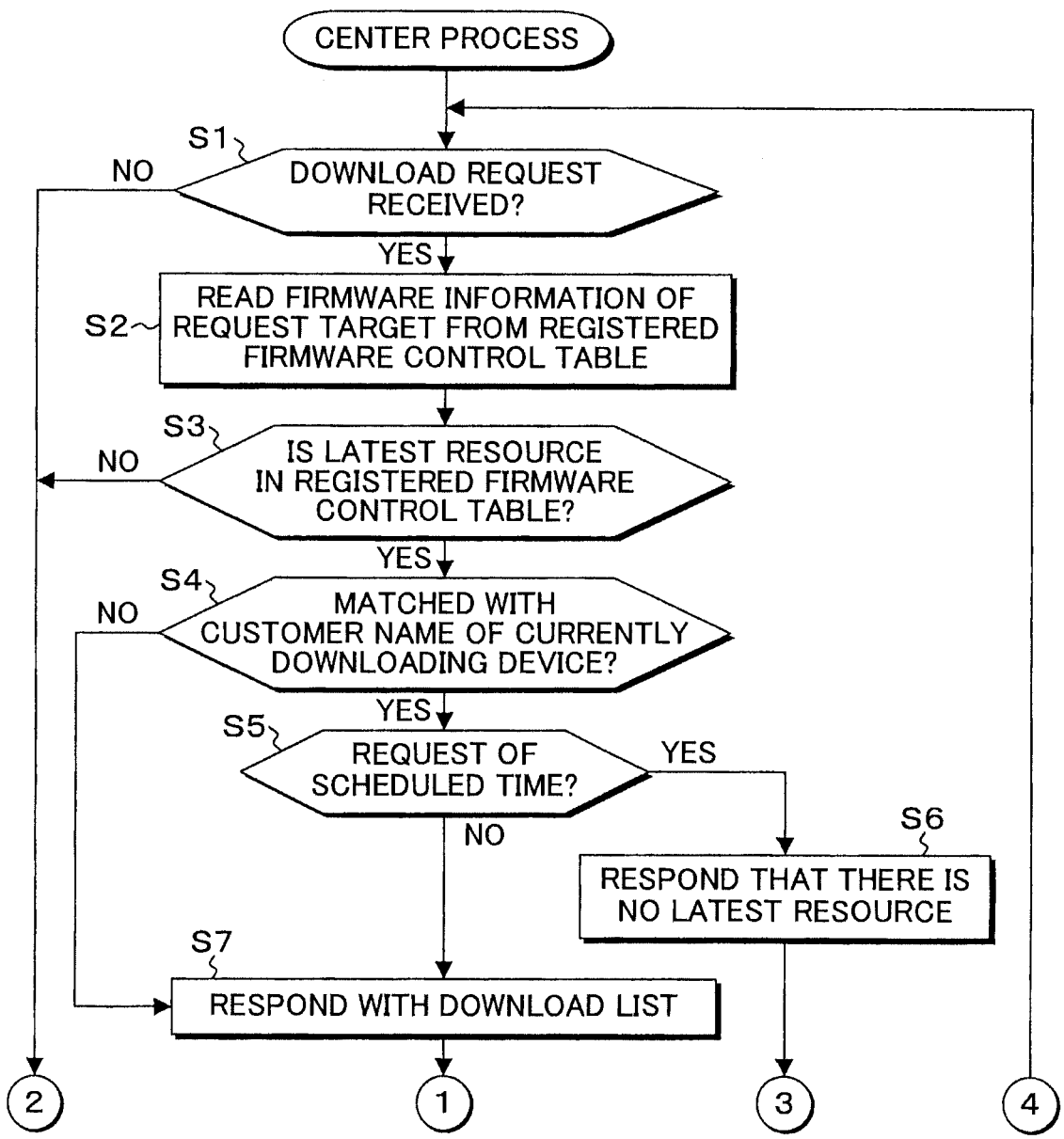
FIGS. 19A and 19B are flow charts showing a center process of the download center device in the embodiment of FIG. 16.
Figure 19B:
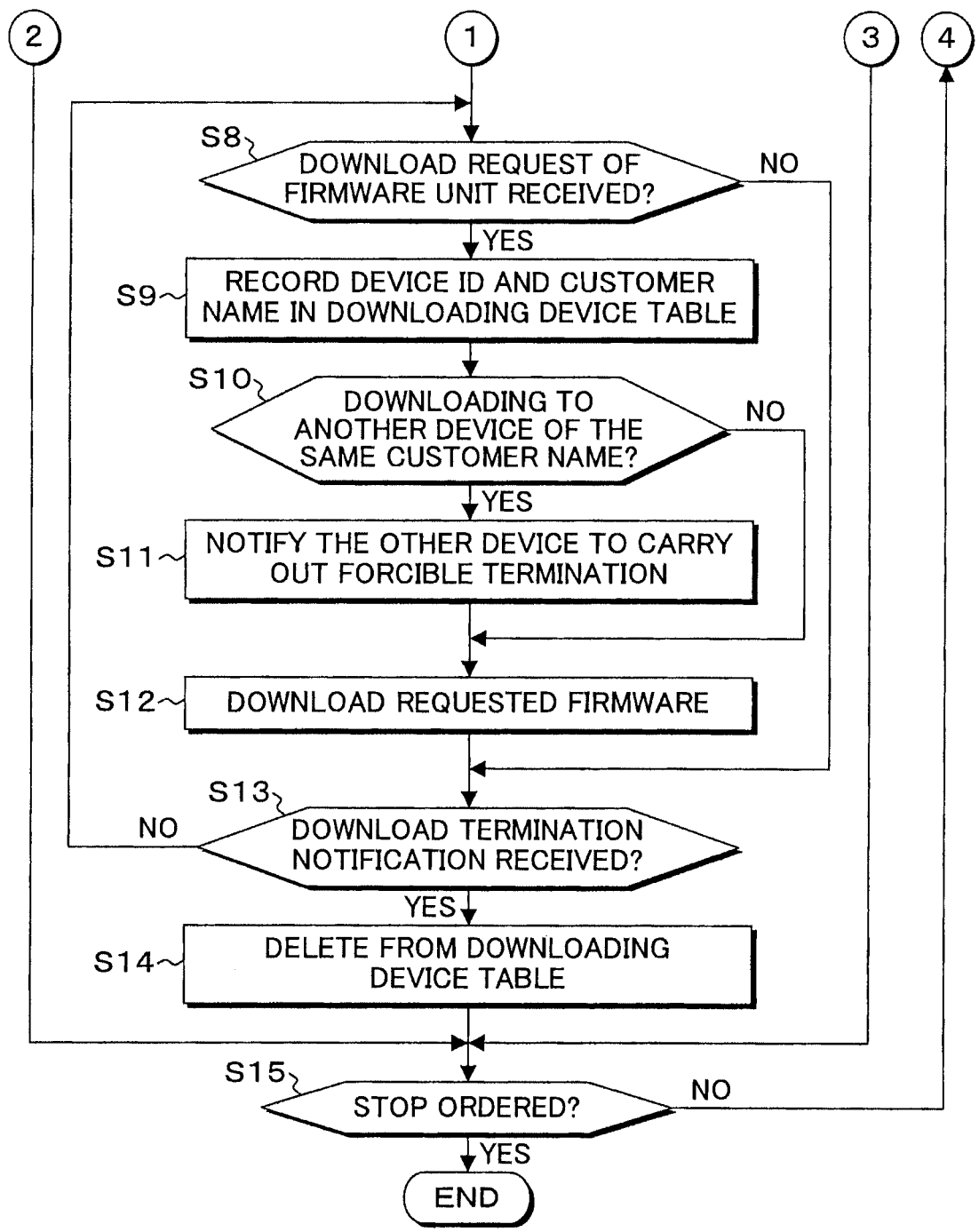

FIGS. 19A and 19B are flow charts showing a center process of the download center device in the second embodiment of FIG. 16. In the center process of FIGS. 19A and 19B, the processes of steps S5, S10, and S11 are added to the center process of the first embodiment shown in FIGS. 14A and 14B. In FIGS. 19A and 19B, in the center process of the second embodiment, when reception of the download request is determined at step S1, the firmware information of the request target is read from the registered firmware control table at step S2, and whether a latest resource is present in the registered firmware control table is determined at step S3. If there is the latest resource, whether the customer name of the currently downloading device and the customer name of the download request are matched is determined at step S4. When the customer names are matched, whether it is a request according to the scheduled time, in other words, whether it is an automatic request according to the scheduled time or a request by an operator operation is determined at step S5. If it is the download request according to the scheduled time, a response that there is no latest resource is responded at step S6 even when there is the latest resource. On the other hand, if it is the download request by the operator operation, in other words, if it is not the download request of the scheduled time, the process proceeds to step S7 even when the customer names are matched, and the download list showing the latest resource is responded. Subsequently, when the process proceeds to step S8 and reception of the download request in the firmware unit from the terminal device-side is determined, the device ID and the customer name are recorded in the downloading device table 28 shown in FIG. 11 at step S9. Then, at step S10, whether another device of the same customer name is carrying out download is determined. If the other device is carrying out download, the other device that is carrying out download is notified to carry out forcible termination at step S11. Subsequently, at step S12, the requested firmware is downloaded, and the download in the firmware unit from step S8 is repeated until the download termination notification is received from the terminal device-side at step S13. At step S13, when the download termination notification is received from the terminal device-side, the process proceeds to step S14, wherein the device ID and the customer name are deleted from the downloading device table 28 shown in FIG. 11, and the series of processes with respect to the download request received at step S1 is terminated. These processes of steps S1 to step S14 are repeated until stop is ordered at step S15.

Figure 20A:
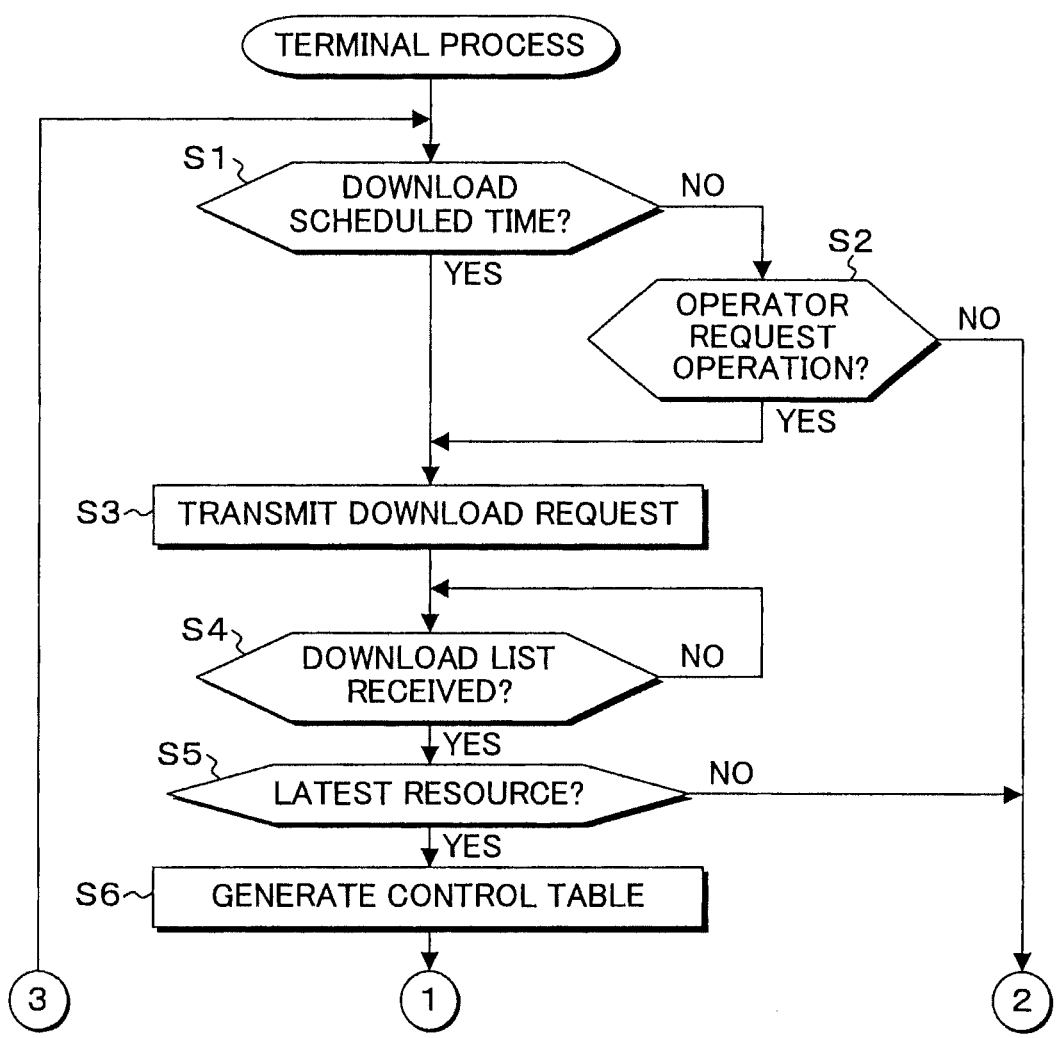
FIGS. 20A and 20B are flow charts showing a terminal process of the terminal device in the embodiment of FIG. 16.
Figure 20B:
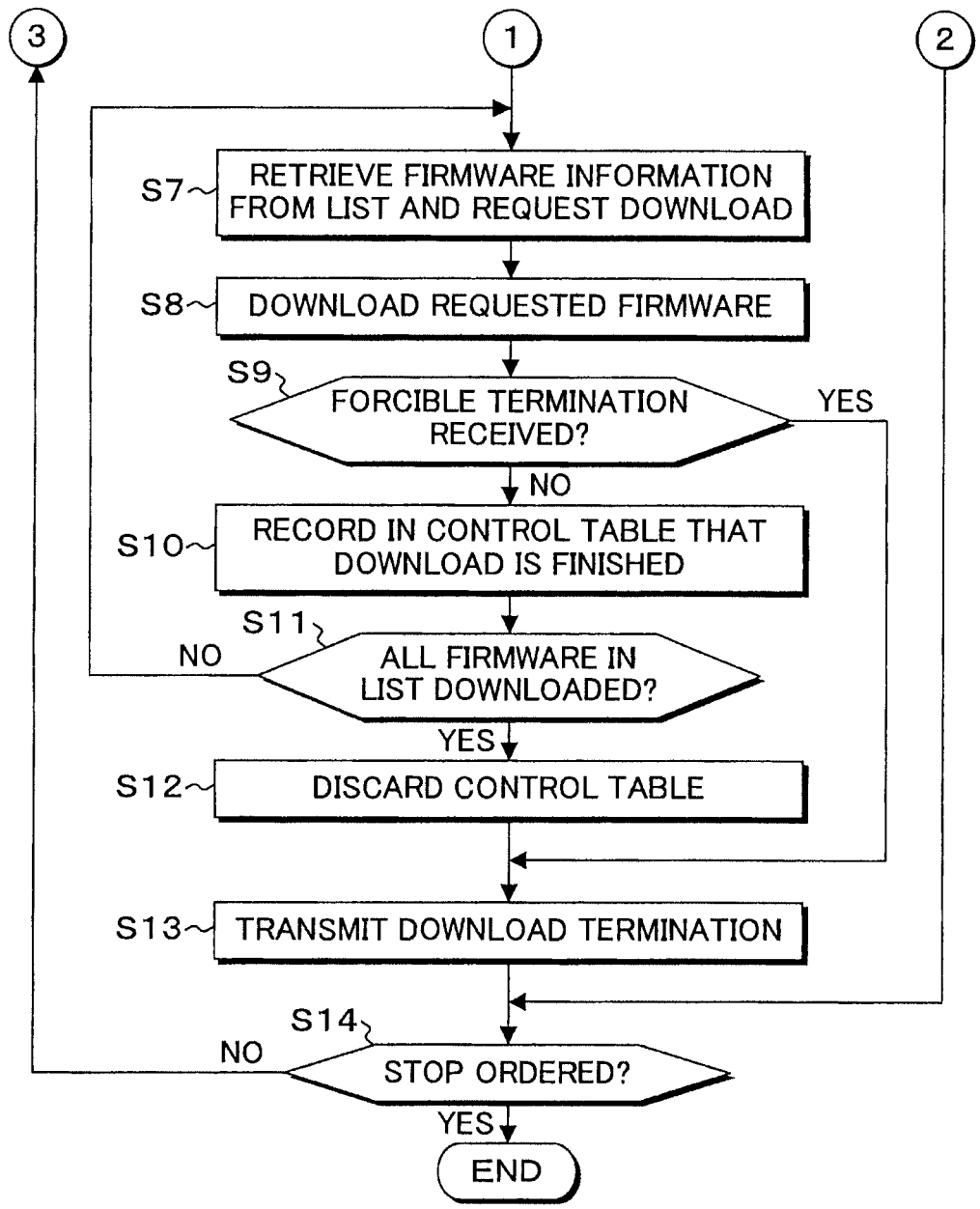

FIGS. 20A and 20B are flow charts showing a terminal process of the terminal device in the second embodiment of FIG. 16. The terminal process of FIGS. 20A and 20B is the same as that of the first embodiment of FIG. 15, except that the process that is carried out when the forcible termination notification is received at step S9 is added to the terminal process of the first embodiment of FIG. 15. More specifically, steps S1 to S8 of FIGS. 20A and 20B are the same as steps S1 to S8 of FIG. 15; after download of the requested firmware in the firmware unit is terminated, whether the forcible termination notification has been received is checked at step S9; and, if the forcible termination notification has been received, steps S10 to S12 are skipped to proceed to step S13, wherein the download termination notification is transmitted to the download center device 10, thereby stopping the download at the point the forcible termination notification is received. At this point, regarding the download control table 44 shown in FIG. 12, the contents of the download control table 44 at the point of interruption caused by the forcible termination notification are remaining without change, since discarding of the download control table of step S12 has been skipped. When download is requested next time in accordance with the time schedule, download is not requested for the firmware that has already been downloaded even when the download list that is the same as the first time is responded, and download is resumed for the interrupted remaining firmware.

Figure 21:
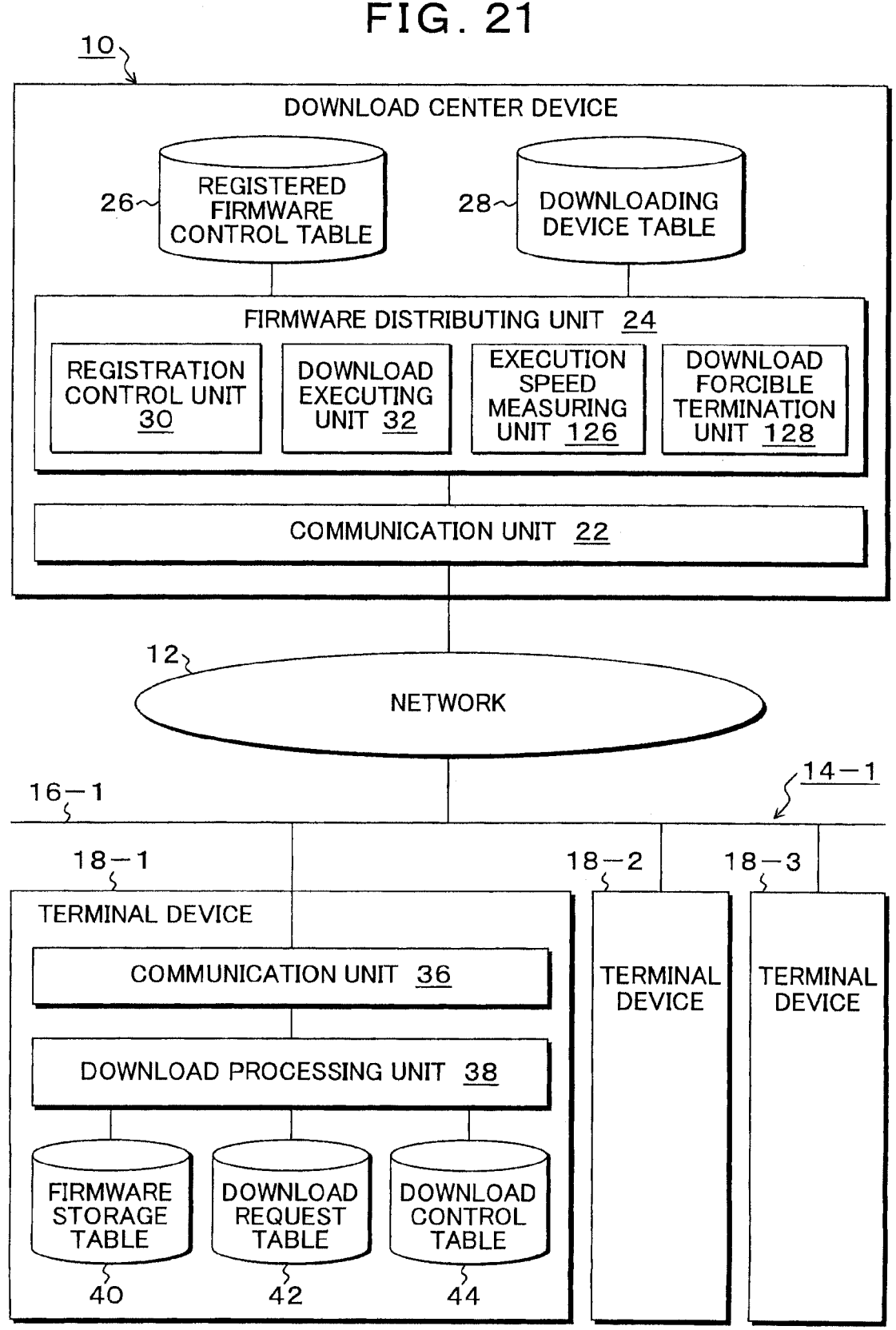
FIG. 21 is a block diagram showing a functional configuration of a download center device and terminal devices of another embodiment.

FIG. 21 is a block diagram showing a functional configuration of a download center device and terminal devices in a third embodiment. In the third embodiment of FIG. 21, the download center device 10 has the communication unit 22, the firmware distributing unit 24, the registered firmware control table 26, and the downloading device table 28; and the firmware distributing unit 24 is provided with the registration control unit 30 and the download executing unit 32; which is the same as the first embodiment of FIG. 2. In addition to that, in the third embodiment of FIG. 21, an execution speed measuring unit 126 and a download forcible termination unit 128 are provided. The execution speed measuring unit 126 measures the execution speed when download is executed in the firmware unit by the download executing unit 32. Specifically, the start time and the termination time of firmware download is measured, and the execution speed (bps) is measured from the number of bytes of the firmware downloaded during the time. When firmware is downloaded, if the execution speed measured by the execution speed measuring unit 126 is reduced with respect to the execution speed measured upon previous firmware download, the download forcible termination unit 128 transmits a forcible termination notification to the terminal device of the request source and interrupts the download in the process. The download forcible termination based on the download execution speed in the third embodiment avoids overlapping of the download that is carried out by a plurality of terminal devices sharing a communication line, by determining reduction in the execution speed caused by sharing of the same communication line in the case in which, for example, download of the terminal devices 18-1 and 18-2 belonging to the same site 14-1 is overlapped, and stopping the download of the device at which the execution speed is reduced with respect to the previous time.

Figure 22A:
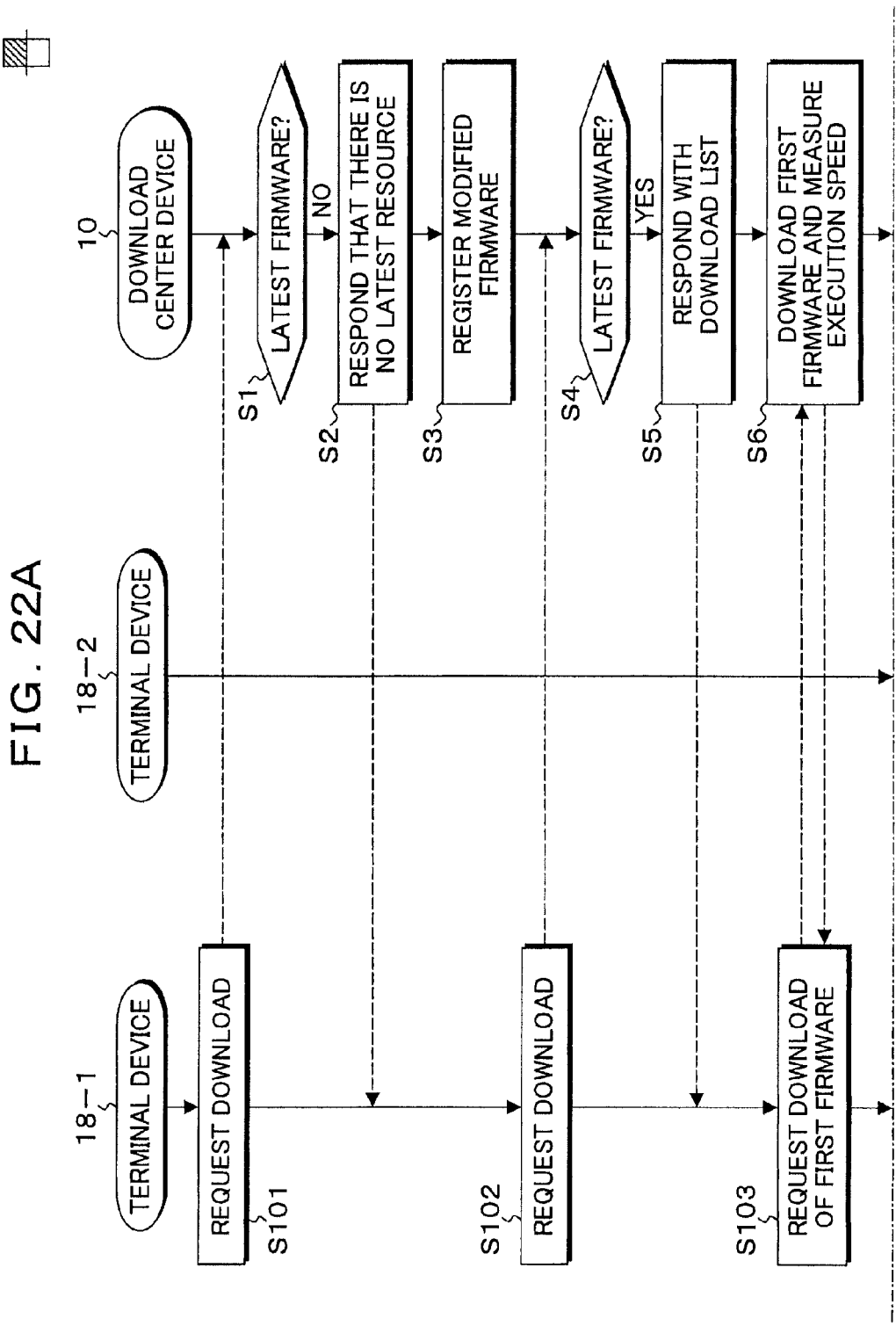
Figure 23B:
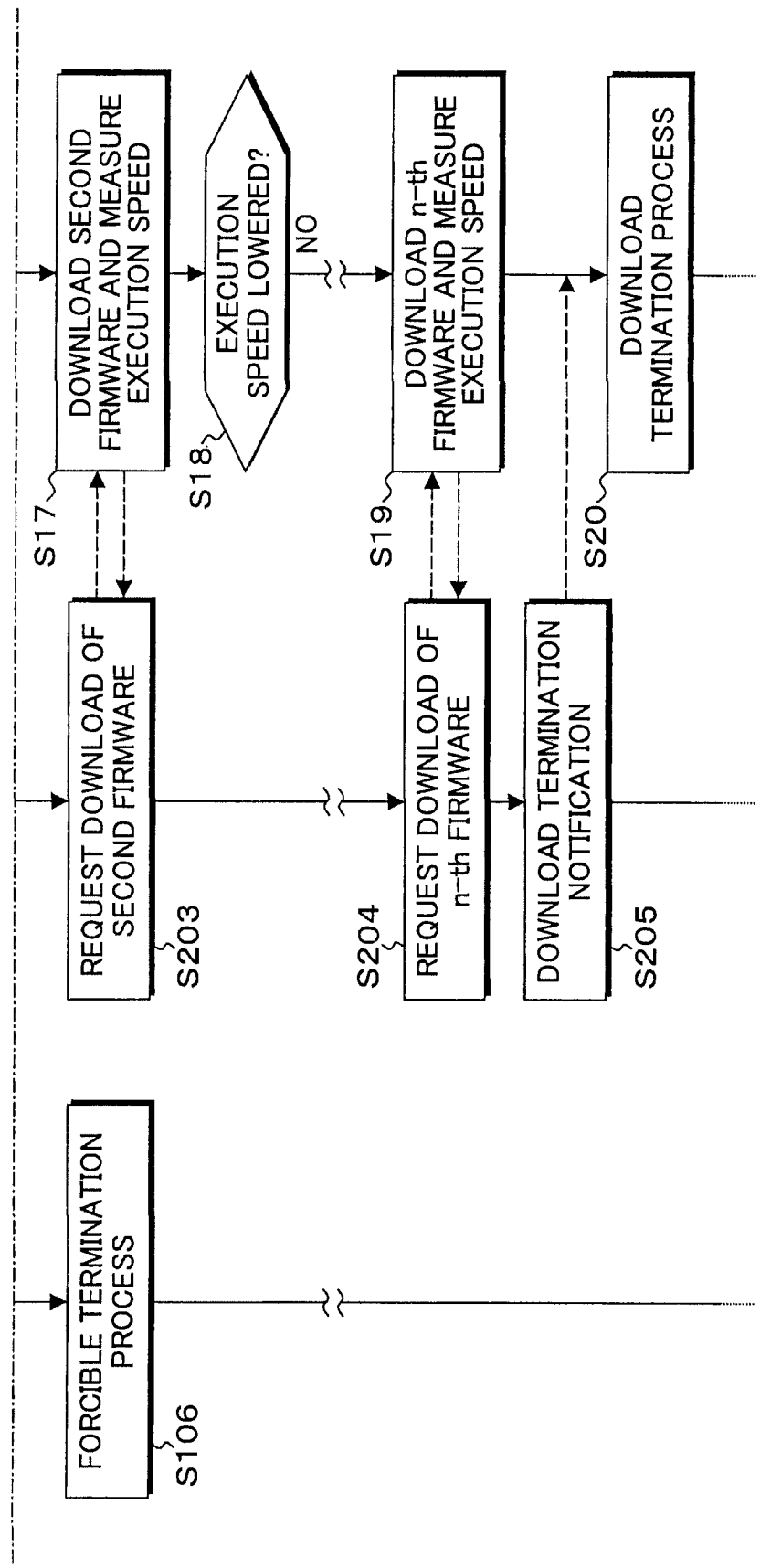
Figure 24:
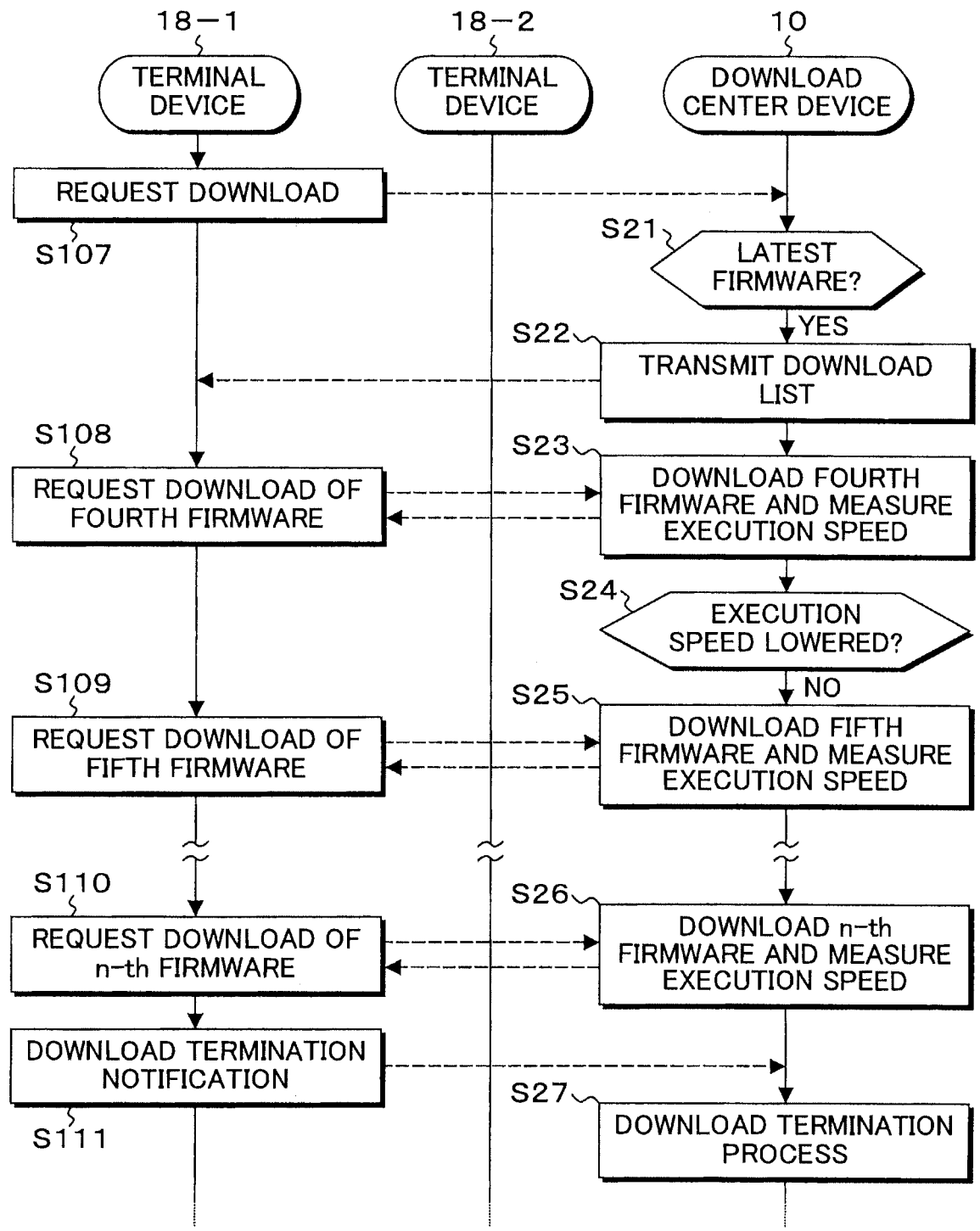
FIG. 24 is a time chart showing the download processes of the firmware subsequent to FIGS. 23A and 23B.

FIGS. 22A, 22B, 23A, 23B and 24 are time charts showing download processes of firmware in the third embodiment of FIG. 21. In FIGS. 22A and 22B, the processes of steps S101 to S103 at the terminal device 18-1 and steps S1 to S6 at the download center device 10 corresponding thereto are basically same as the first embodiment shown in FIG. 13; however, in the download of the first firmware at step S6 at the download center device 10, the execution speed of the download of the first firmware is measured. Then, when the download of the first firmware is terminated, whether the execution speed has been reduced is determined at step S7. Herein, the measurement of the execution speed at step S6 obtains the execution speed of first download at the terminal device 18-1. Therefore, the execution speed of previous time does not exist, and the determination of reduction in the execution speed at step S7 always determines that the execution speed has not been reduced since the execution speed of the previous time does not exist. As a matter of course, whether the execution speed has been reduced may be determined by setting a predetermined value in advance as an initial value of the execution speed and comparing the execution speed of the download of the first firmware measured at step S7 with the initial value. Subsequently, the terminal device 18-1 requests download of second firmware at step S104, and the download center device 10 downloads the second firmware and measures the execution speed thereof at step S8. Subsequently, at step S9, the previous execution speed of the download of the first firmware at step S1 and the execution speed of the download of the second firmware of this time are compared with each other, and whether the execution speed has been reduced is determined. In this case, the execution speed is not reduced since the terminal device 18-1 is the only device that is executing download. Subsequently, if the other terminal device 18-2 utilizing the same communication line requests download at step 5201, the download center device 10 determines that latest firmware is present at step S10 and makes a response with a download list at step S11 of FIGS. 23A and 23B. In response to this, the terminal device 18-2 requests download of first firmware at step S202, and the download center device 10 downloads the first firmware and measures the execution speed thereof at step S12. Then, at step S13, if the execution speed has been reduced is detected for the execution speed obtained by the download of the first firmware of the terminal device 18-2. However, reduction in the execution speed is not determined since this is the first execution speed measurement of the terminal device 18-1. Subsequently, when the terminal device 18-1 which is currently executing download requests download of third firmware at step 5105, the download center device 10 downloads the third firmware and measures the execution speed at step S14. In this case, the two terminal devices 18-1 and 18-2 sharing the same communication line are executing download. Therefore, the execution speed measured at step S14 is reduced with respect to the previous execution speed measured in the download of the second firmware at step S8, reduction in the execution speed is determined at step S15, and a forcible termination notification is transmitted to the terminal device 18-1 at step S16. In response to this, the terminal device 18-1 executes a forcible termination process at step 5106 and interrupts the download. Subsequently, the terminal device 18-2 requests download of second firmware at step S203, and the download center device 10 downloads the requested second firmware and measures the execution speed thereof at step S17. At this point, since the terminal device 18-1, which had been executing download, interrupts download by the forcible termination, the download carried out by the terminal device 18-2 is not overlapped with the download of the other device, and the execution speed is not reduced at step S18 with respect to the previous time. In this state, the terminal device 18-2 sequentially repeats download of third firmware and subsequent firmware and measurement and determination of the execution speed, requests the last n-th download at step 5204, and outputs a download termination notification at step S205 when the download of the last n-th firmware by the download center device 10 is finished at step S19. In response to this, at step S20, the download center device 10 terminates the series of processes with respect to the download request from the terminal device 18-2. Then, as shown in FIG. 24, when the terminal device 18-1, which has interrupted the download, requests download in accordance with the scheduled time at step 5107, presence of latest firmware is determined by the download center device 10 at step S21, and the download list is transmitted at step S22. At step S108, the terminal device 18-1 requests download of next fourth firmware that is subsequent to the already-downloaded third firmware. In response to this, the download center device 10 executes download of the fourth firmware at step S23 and measures the execution speed thereof. Subsequently, reduction in execution speed is determined at step S24, wherein the execution speed is not reduced with respect to the previous time since the terminal device 18-1 is the only device executing download at this point, and the process is continued without outputting the forcible termination notification. Then, the terminal device 18-1 sequentially requests download of the remaining fifth firmware to last n-th firmware from step S109 to step S110. In response to this, the download center device 10 executes download of the fifth firmware to the last n-th firmware at steps S25 to S26, measures the execution speeds thereof, and determines reduction in the execution speeds. At step S111, the download termination notification is carried out. In response to this, at step S27, a termination process is carried out by terminating the series of download with respect to the download request from the terminal device 18-1. In the embodiment of FIGS. 22A and 22B to FIG. 24, the download requests of the two terminal devices 18-1 and 18-2 which are present in the same site are taken as examples; however, for example, when the download request is similarly output from the other terminal device 18-3, which belongs to the same site, during download execution by the terminal device 18-2 in FIGS. 23A and 23B, the forcible termination notification is transmitted to the terminal device 18-2, which is currently during execution, at the point when reduction in the execution speed is determined, thereby stopping the download, so as to let the terminal device 18-3, which has newly requested download, carry out download of firmware without overlapping with the download of the other devices.

Figure 25A:
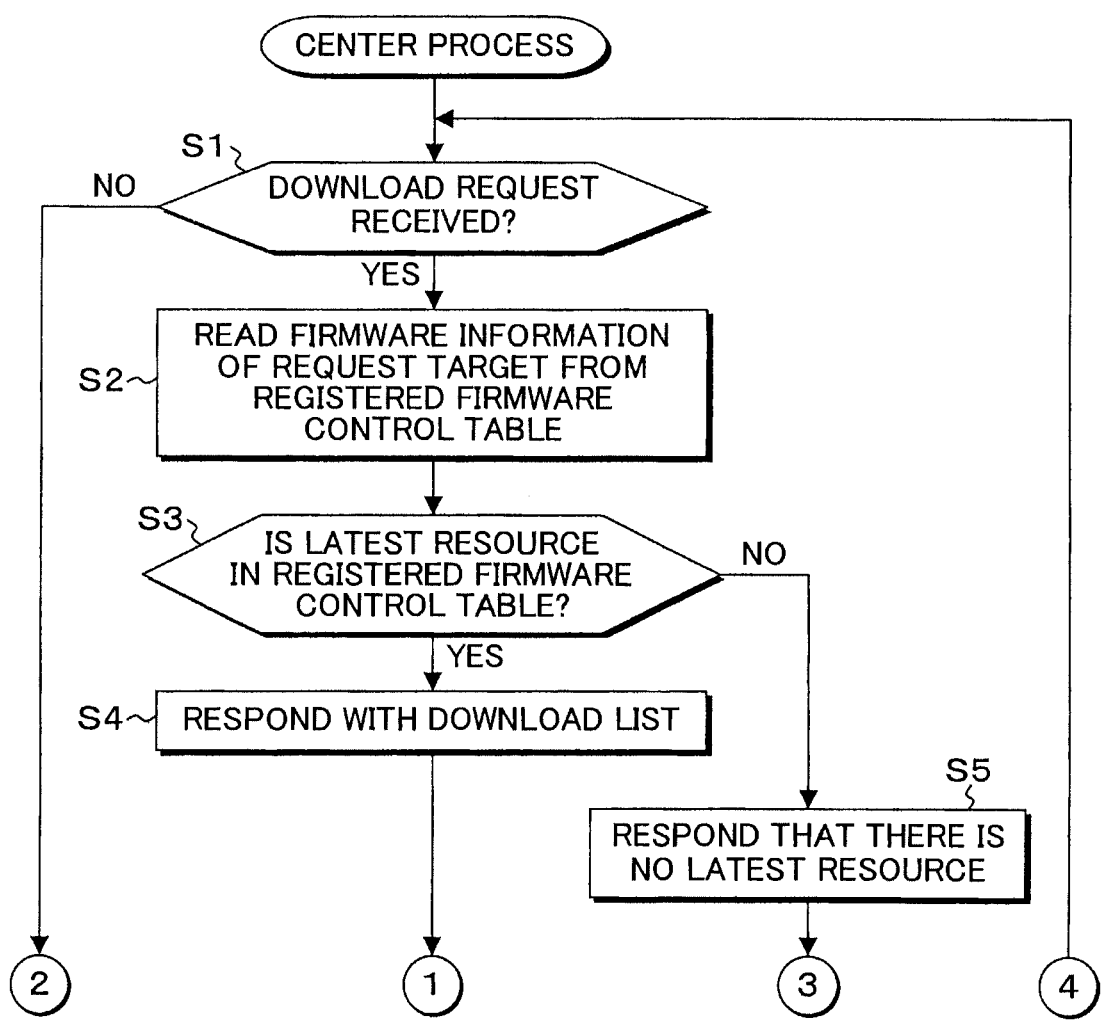
FIGS. 25A and 25B are flow charts showing a center process of the download center device in the embodiment of FIG. 21.
Figure 25B:
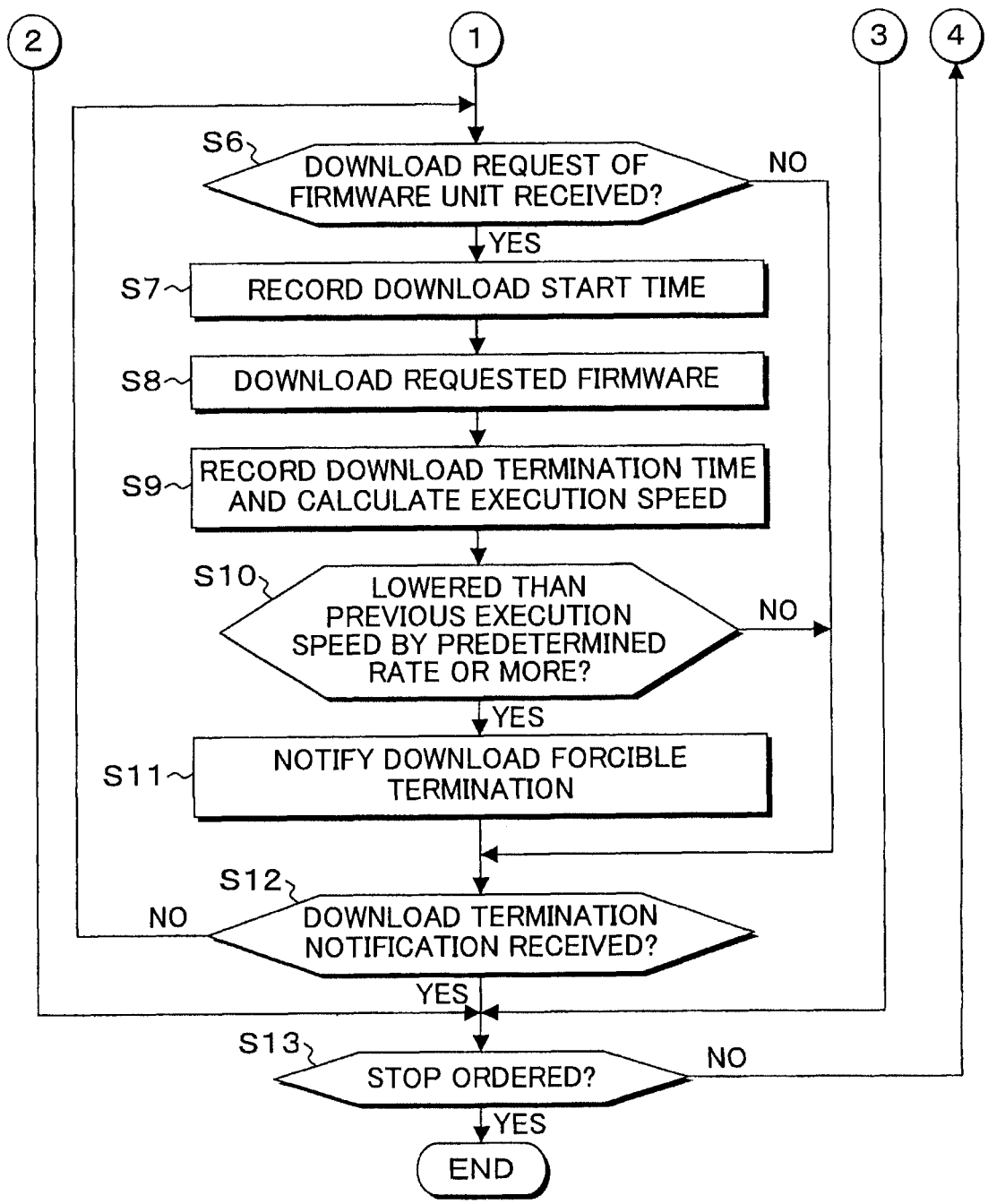
Figure 26:
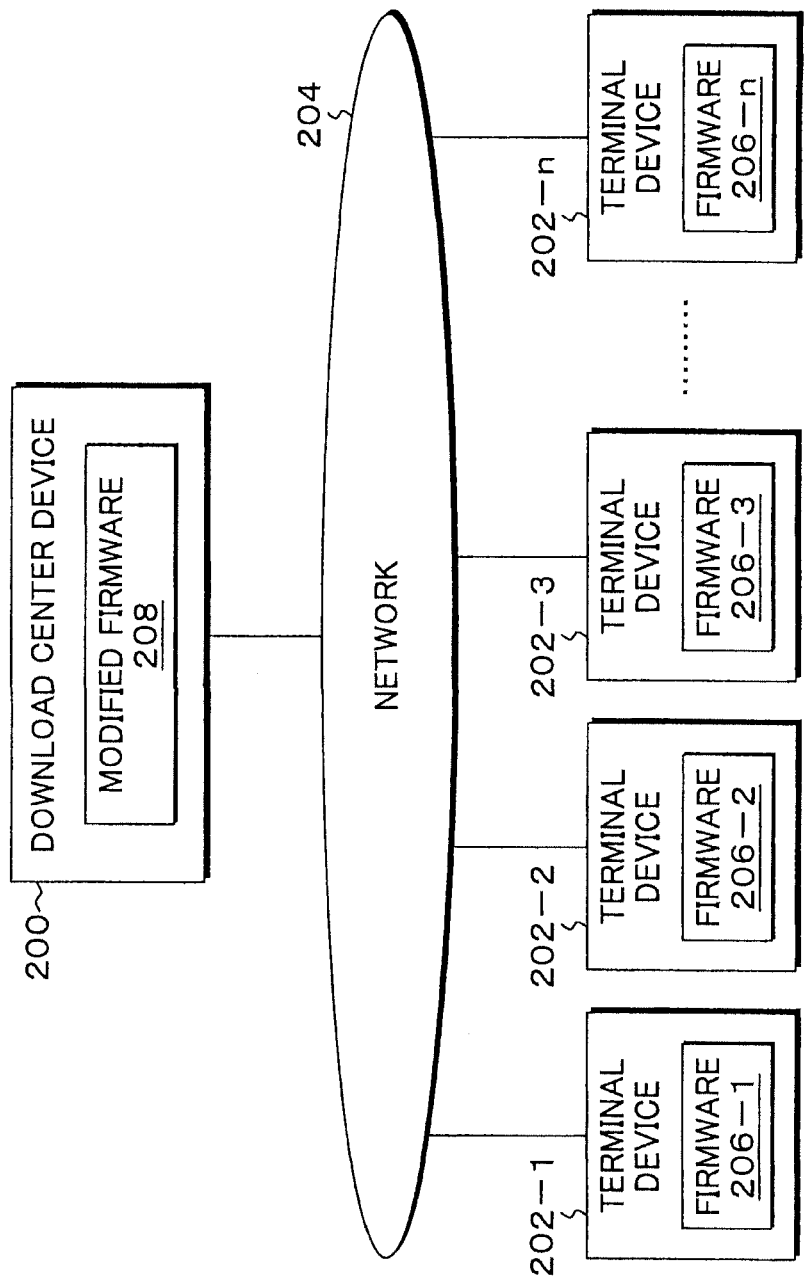
FIG. 26 is an explanatory diagram showing a conventional firmware distributing system.
Figure 27:
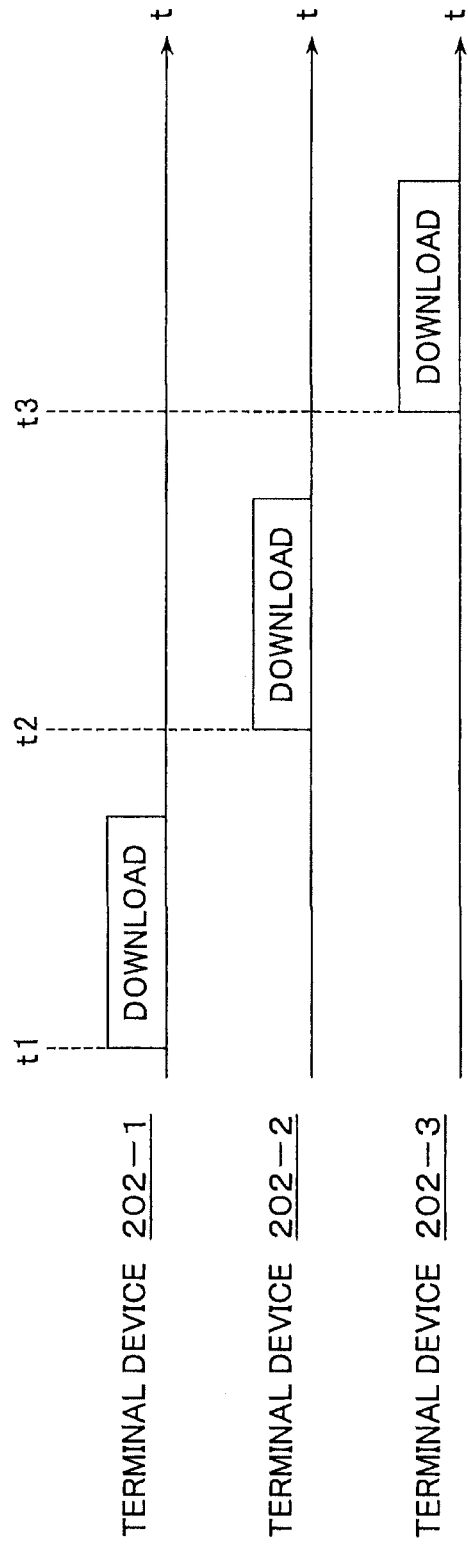
FIG. 27 is a time chart showing a distributing process of the conventional system that carries out download to a plurality of terminal devices with shifted start time.
Figure 28:
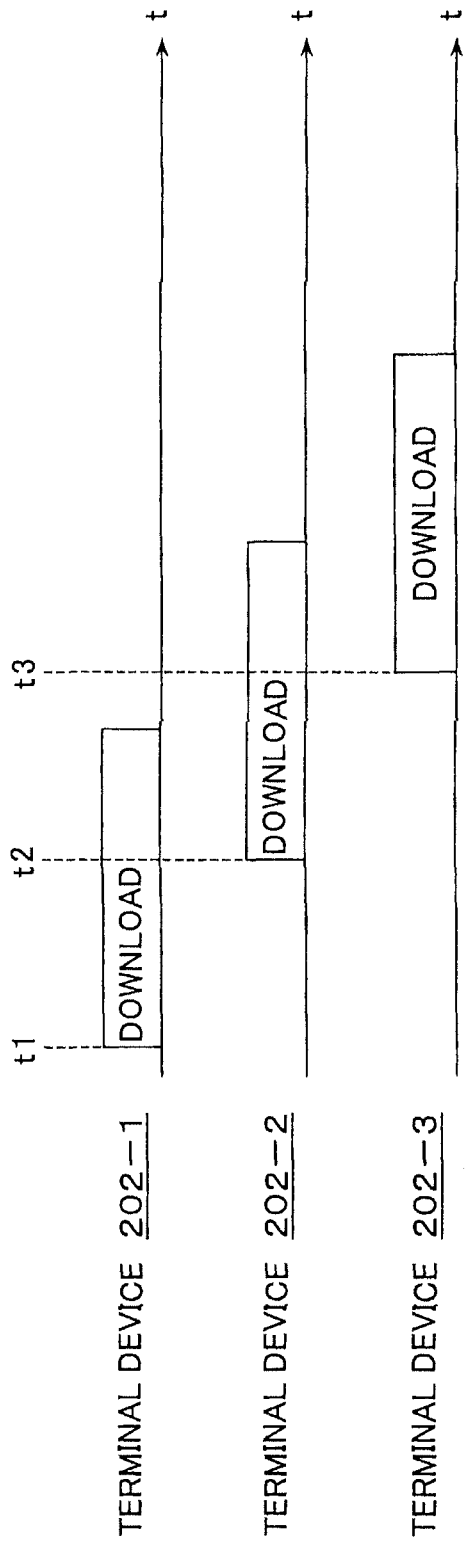
FIG. 28 is a time chart showing a problem of the case in which the degree of shifting the download start time is not enough.
Figure 29:
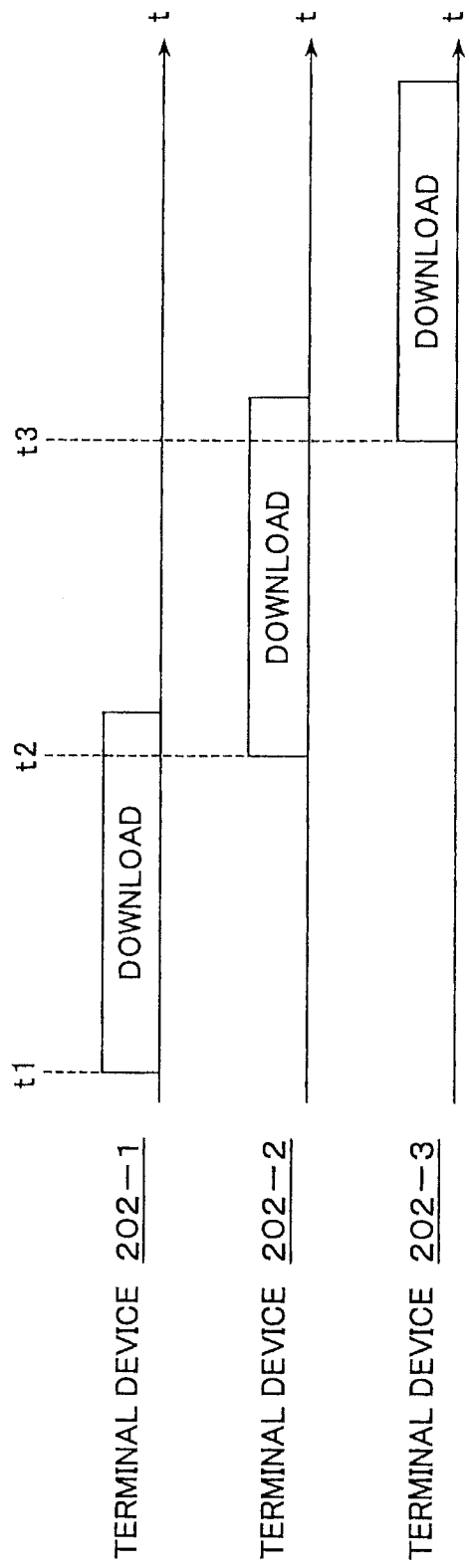
FIG. 29 is a time chart showing a problem of the case in which modified firmware is increased and download takes time.

FIGS. 25A and 25B are flow charts showing a center process of the download center device in the third embodiment of FIG. 21. In FIGS. 25A and 25B, in the center process of the third embodiment, when reception of the download request is determined at step S1, the firmware information of the request target is read from the registered firmware control table at step S2, whether a latest resource is present in the registered firmware control table is determined at step S3, and, if the latest resource is present, the download list is responded at step S4. If there is no latest resource, a response that there is no latest resource is made at step S5. In the case in which the download is responded at step S4, when reception of the download request in the firmware unit is determined at step S6, the download start time is recorded at step S7, and download of the requested firmware is executed at step S8. When the download is terminated, at step S9, the download terminated time is recorded, the download execution time is obtained from the start time and the terminated time, and the execution speed (bps) is calculated by dividing the data amount of the firmware by the execution time. Subsequently, at step S10, whether it has been reduced by a predetermined rate or more than the previous execution speed is determined. Specifically, the speed ratio of the execution speed of the previous time and the execution speed of this time is obtained, and reduction in the execution speed is determined when the speed ratio is reduced by predetermined percentages or more. There is no previous execution speed for the first download. Therefore, reduction in the execution speed is not determined for the first time, and the reduction determination of the execution speed by comparison with the previous execution speed can be actually carried out for the second and subsequent time. As a more specific example of the determination of the reduction in execution speed, the execution speed measured in the first download is retained as a reference speed, the ratio of the measured execution speed and the reference speed (reference speed/measured execution speed) is obtained for the second time, and reduction in the execution speed is detected when this ratio is equal to or less than a predetermined ratio. After the second time, the reference speed is updated by the execution speed of the download of that time, so that the reference speed is always the execution speed of the previous time, and reduction detection with the next execution speed is carried out. When reduction in the execution speed is determined at step S10, the process proceeds to step S11, wherein download forcible termination is notified to the corresponding terminal device, thereby forcibly terminating the download. When the execution speed is not reduced than the previous execution speed, step S11 is skipped. Subsequently, whether the download termination notification is received is checked at step S12, the processes from step S6 are repeated until it is received, furthermore, the processes of steps S1 to S12 are repeated until stop is ordered at step S13. On the other hand, the terminal process in the terminal device in the third embodiment of FIG. 21 is the same as the flow chart of the terminal process of the second embodiment shown in FIGS. 20A and 20B, wherein when the forcible termination notification accompanying the reduction in the download execution speed is determined at step S9, steps S10 to S12 are skipped, the download termination notification is transmitted at step S13, and the download is interrupted at that point. The present embodiments provide firmware distributing programs executed by the computers of the download center devices 10 of the embodiments shown in FIG. 2, FIG. 16, and FIG. 21, and the programs have the contents shown in the flow charts of the center processes of FIGS. 14A, 14B, 19A, 19B, 25A and 25B. The present embodiments also provide computer recording media recording the programs having the contents of the center processes of FIGS. 14A, 14B, 19A, 19B, 25A and 25B. The recording media include: portable storage media such as CD-ROMs, floppy disks (R), DVD disks, magnetic optical disks, and IC cards; storage devices such as hard disk drives provided inside/outside computer systems; databases which retain programs via lines; other computer systems and the databases thereof; and online transmission media. The present firmware distributing devices, programs, and methods are not limited to the above described embodiments, but include arbitrary modifications that do not impair the objects and advantages thereof. The present firmware distributing devices, programs, and methods are not limited by the numerical values shown in the above described embodiments.

What is claimed is:

1. A firmware distributing device, comprising:
   a communication unit connected with two or more terminal devices through a network;
   a registered firmware control table which registers modified firmware;
   a downloading device table, which comprises device IDs and customer names, registering and controlling names of customers owning terminal devices which are currently executing a download until the download is terminated; and
   a firmware distributing unit, comprising a processor and a memory, which is provided with a registration control unit, a download executing unit and a download stopping unit, distributing a firmware;
   wherein,
   the registration control unit registering the modified firmware to the registered firmware control table and controlling the firmware;
   the download executing unit, when a download request is received from either of a terminal device of two or more terminal devices that share a communication line, determining unupdated firmware in a terminal device which requests the download;
   and
   the download stopping unit, when a download request is received from another terminal device during execution of a download of firmware to the terminal device, acquiring user identification information obtained from the download request and, if the user identification information matches user identification information of the terminal device which is already carrying out a download, the download request is determined to be the download request from the terminal device that belongs to the same customer site sharing a communication line, stopping download of the terminal device that outputs the download request by responding that there is no unupdated firmware even when there is unupdated firmware, where overlapping of download of the plurality of terminal devices sharing the communication line is avoided.

2. The firmware distributing device according to claim 1, wherein the download request received from the terminal device includes a device identifier, the user identification information, and updated firmware information; and the download executing unit compares the updated firmware information obtained from the download request with registered firmware information controlled by the registration control unit so as to determine the unupdated firmware.

3. The firmware distributing device according to claim 1, wherein the download executing unit responds and transmits list information of the unupdated firmware to the terminal device and sequentially downloads the unupdated firmware corresponding to a download request from the terminal device, the download request being in a firmware unit and based on the list information.

4. The firmware distributing device according to claim 1, further comprising an operator request processing unit, if the download request is determined to be a download request by an operator operation, cancelling the download stop by the download stopping unit and executing download by the download executing unit, and transmitting a forcible termination notification to the other terminal device already executing download so as to interrupt the download in the process.

5. The firmware distributing device according to claim 4, wherein the download request further includes download schedule time information; and the operator request processing unit compares the download schedule time information obtained from the download request with actual request time and, if unmatched, determines that the download request is the download request by the operator operation.

6. A non-transitory computer-readable storage medium storing computer executable instructions that when executed cause the computer to perform the steps of:
   storing, a registered firmware control table which registers modified firmware; and
   storing, a downloading device table, which comprises device IDs and customer names, registering and controlling names of customers owning terminal devices which are currently executing a download until the download is terminated;
   registering the modified firmware to the registered firmware control table and controlling the firmware;
   determining, when a download request is received from either of a terminal device of two or more terminal devices that share a communication line, unupdated firmware in a terminal device which requests the download; and
   acquiring, when a download request is received from another terminal device during execution of a download of firmware to the terminal device, user identification information obtained from the download request and, if the user identification information matches user identification information of the terminal device which is already carrying out a download, the download request is determined to be the download request from the terminal device that belongs to the same customer site sharing a communication line, stopping download of the terminal device that outputs the download request by responding that there is no unupdated firmware even when there is unupdated firmware, where overlapping of download of the plurality of terminal devices sharing the communication line is avoided.

7. The storage medium according to claim 6, wherein the download request received from the terminal device includes a device identifier, the user identification information, and updated firmware information; and the download executing unit compares the updated firmware information obtained from the download request with registered firmware information controlled by the registration control unit so as to determine the unupdated firmware.

8. The storage medium according to claim 6, wherein the download executing unit responds and transmits list information of the unupdated firmware to the terminal device and sequentially downloads the unupdated firmware corresponding to a download request from the terminal device, the download request being in a firmware unit and based on the list information.

9. The storage medium according to claim 6, further comprising an operator request processing unit, if the download request is determined to be a download request by an operator operation, cancelling the download stop by the download stopping unit and executing download by the download executing unit, and transmitting a forcible termination notification to the other terminal device already executing download so as to interrupt the download in the process by the operator request processing unit.

10. The storage medium according to claim 9, wherein the download request further includes download schedule time information; and the operator request processing unit compares the download schedule time information obtained from the download request with actual request time and, if unmatched, determines that the download request is the download request by the operator operation.

* * * * *

UNITED STATES PATENT AND TRADEMARK OFFICE
CERTIFICATE OF CORRECTION

| | |
|---|---|
| PATENT NO. | : 8,595,140 B2 |
| APPLICATION NO. | : 12/664993 |
| DATED | : November 26, 2013 |
| INVENTOR(S) | : Yoshihiro Kimura et al. |

It is certified that error appears in the above-identified patent and that said Letters Patent is hereby corrected as shown below:

In the Specification

In Column 1, Line 5, Delete "Jun. 26, 2007." and insert -- Jun. 25, 2007. --, therefor.

Signed and Sealed this
First Day of April, 2014

Michelle K. Lee
*Deputy Director of the United States Patent and Trademark Office*